United States Patent [19]
Bentall et al.

[11] Patent Number: 6,163,525
[45] Date of Patent: Dec. 19, 2000

[54] NETWORK RESTORATION

[75] Inventors: Mark Bentall, Gwent; Brian Charles Hargrave Turton, South Glam, both of United Kingdom

[73] Assignee: Nortel Networks Limited, Montreal, Canada

[21] Appl. No.: 08/975,014

[22] Filed: Nov. 20, 1997

[30] Foreign Application Priority Data

Nov. 29, 1996 [DE] Germany ................................. 9625020

[51] Int. Cl.⁷ .................................................. H04L 12/28
[52] U.S. Cl. ............................ 370/227; 370/228; 370/220
[58] Field of Search ..................................... 370/222, 225, 370/227, 228, 248, 219, 220, 221, 351; 340/825.01, 827

[56] References Cited

U.S. PATENT DOCUMENTS

| | | | |
|---|---|---|---|
| 5,173,689 | 12/1992 | Kusano | 340/827 |
| 5,550,805 | 8/1996 | Takatori et al. | 370/222 |
| 5,652,751 | 7/1997 | Sharony | 370/227 |
| 5,852,600 | 12/1998 | Russ | 370/228 |
| 5,862,125 | 1/1999 | Russ | 370/228 |
| 5,933,590 | 8/1999 | Allen | 395/182.02 |
| 5,999,103 | 12/1999 | Croslin | 340/825.01 |
| 5,999,286 | 12/1999 | Venkatesan | 359/117 |

*Primary Examiner*—Chi H. Pham
*Assistant Examiner*—Brenda H. Pham
*Attorney, Agent, or Firm*—Lee, Mann, Smith, McWilliams, Sweeney & Ohlson

[57] ABSTRACT

For restoration of a network a plurality of possible alternative routes are determined. Messages are passed between nodes along the alternative routes to determine a spare capacity of each link in the alternative routes. An alternative route is selected from the possible alternative routes on the basis of a database of the determined link spare capacities for each of the possible alternative routes, built up at a chooser node at one side of the failed part of the network.

24 Claims, 23 Drawing Sheets

EVALUATION OF DISTANCE FROM FAILED PART

STATE DIAGRAM FOR MESSAGE PERFORMING LOOP ELIMINATION

NETWORK RESTORATION

FIELD OF THE INVENTION

The present invention relates to methods of providing alternative routes in a network following a failure, to methods for selecting an alternative route in a network, to networks, and to nodes for networks.

BACKGROUND TO THE INVENTION

In networks such as mesh type networks, there are numerous possible routes for passing communication between one node and another node. Many types of routing algorithms are known for finding the shortest route, or for making best use of available capacity. One particular case, or application of routing methods is for the purpose of restoring a network after a failure has been detected. Such a failure may take the form of loss of a link between nodes, or loss of a node. Methods of restoring the network can be categorised as preplanned, or adaptive. Preplanned methods require knowledge of the topology of the network. Adaptive methods involve finding out the topology of the network around the failure, in real time. This involves making use of some processing capability at the nodes.

Conventional methods may involve distributed processing at the nodes, or centralised control by a remote processing means.

Conventionally, there have been three main characteristics by which restoration methods have been assessed. Firstly the percentage of the capacity of the failed link which is restored using the alternative routes, can be measured. Secondly, the length of the alternative routes can be measured (shorter routes are preferred usually). Thirdly, the time taken to identify and establish the alternative routes can be assessed.

Clearly, the performance of a restoration method depends crucially on how much spare capacity there is in the alternative routes. If the alternative routes are heavily loaded already and have little spare capacity, then more such alternative routes will be needed, and they are likely to be longer.

In one known algorithm (Grover WD "Self Healing Networks—a distributed algorithm for k-shortest link—disjoint paths in a multigraph with applications in real time network restoration, pages 76 to 106, PhD dissertation, University of Alberta, Autumn 1989), a completely distributed k-shortest paths processing sequence with no prior knowledge of network topology at any node, is disclosed. The process is shown in FIG. 1, steps 50 to 55. FIG. 2 shows in schematic form, the layout of the nodes involved in the process. FIG. 2 shows a relatively simple arrangement. In practice there are likely to be many nodes around the broken link, and many nodes in each route.

When a link failure occurs, two custodial nodes are cast at the end points of the failed link. Using their unique node identification numbers, they order themselves into sender 63 and chooser 64. The sender creates flooding instances which propagate from sender to chooser, for each failed channel, to search out available spare paths. The nodes involved in the search propagation, known as tandem nodes 65, assign spare channels to the flooding instances, and cause the flooding instances to increase their count of the number of hops used. When a chooser receives a flooding instance, it can read the hop count to identify the shortest route. The shortest route is acknowledged, and capacity assigned by the tandem nodes is relinquished unless it is on the acknowledged shortest route. The same process is carried out for each channel which uses the failed link.

Others have proposed variations on this basic algorithm, including the concept of multiple candidate choosers, as shown in "A Distributed Restoration Algorithm for a Multiple Link and Node Failures of Transport Networks" by H Komine et al (proceedings of the IEEE Globecom 1990, pages 459 to 463). Furthermore, in "Restoration Message Transfer Mechanism and Restoration Characteristics of Double Search Self Healing ATM Network", IEEE Journal of Select Areas in Communications, volume 12 number 1 pages 149 to 157, January 1994, there is disclosure of a double search. The sender and chooser take on each others roles, to enable searches in both directions.

However, such methods can result in a large number of search instances, if there are many channels. It is known to use only a single search instance between the sender and chooser, from "Self Healing Techniques Utilising Virtual Path Concept for ATM Networks", Kawamura et al, Electronics and Communication in Japan, part 1, volume 75, number 4, pages 86 to 96, 1992. However, this method involves the search instance obtaining information about capacity for groups of channels, on a channel by channel basis. Again, where there are many channels, the flooding instance will become large and complex.

With all the methods discussed, based on spare capacity being identified and allocated by each tandem node, on a channel basis, for example for each virtual path (VP) in an ATM system, the first virtual path may cause temporary allocation of spare capacity on a wide range of alternative routes, until the shortest route is acknowledged. Such temporary allocation may block a succeeding virtual path or force it to find a much longer route than would otherwise be necessary. Accordingly, performance of such restoration methods may be poor, particularly on networks such as wide area telecommunications networks which may be heavily loaded, and have little spare capacity.

It is also known to use complex max-flow algorithms at the network configuration or design stage, to calculate the minimum amount of spare capacity required to achieve 100% restoration of failures on neighbouring links or nodes. These enable performance testing of restoration algorithms, to see how close they come to optimal restoration. This is unrealistic because real networks are often so heavily loaded that 100% restoration is not possible. Therefore there is a need for algorithms better suited to such heavily loaded networks.

SUMMARY OF THE INVENTION

The invention aims to provide improved methods and systems.

According to a first aspect of the invention there is provided a method of determining an alternative route for a communication between nodes in a network, following failure of part of the network, the network comprising a plurality of nodes, and links between the nodes, the method comprising the steps of:

determining a plurality of possible alternative routes around the failed part;

passing messages between nodes along the alternative routes to determine a spare capacity of each link in the alternative routes; and selecting the alternative route for the communication from said possible alternative routes on the basis of at least the determined link spare capacities.

Determining a spare capacity of each link, rather than allocating capacity on a channel or virtual path basis, enables a reduction in inefficient temporary allocation of spare capacity. Passing messages locally along the alternative routes to determine the spare capacity is more efficient than centralised methods.

Advantageously, the method also comprises the steps of: selecting at least one of the nodes as a chooser node; and passing information relating to the determined spare capacities to a chooser node, wherein the step of selecting the alternative route is carried out by the chooser node. Selecting the alternative route at the chooser node means that restoration processing can be distributed. No central controller is needed, which enables a reduction in the amount of message passing, a quicker response, and more economical use of existing processing power in each of the nodes.

Advantageously, the method also comprises the steps of: using the chooser to select a further alternative route for a further communication on the basis of the link spare capacities determined at the outset, and the capacity occupied by the first alternative route.

By determining the link spare capacities, rather than simply allocating requested capacity, there is no need to send out search messages for alternative routes for each route affected by the network failure. Thus the number of search messages can be reduced, the response time can be reduced, and the efficiency of capacity allocation in the alternative routes can be improved. This latter advantage arises because there is no longer a need for temporary allocation of capacity to any particular path which forces subsequent search messages to take longer alternative routes around the failed part.

Advantageously, the method also comprises the step of allocating at least a part of the spare capacity of each link used by the selected route, to the selected route. Allocating the spare capacity only after the alternative route has been selected also enables the above advantages. If appropriate, the selection step can be delayed until alternative routes have been optimised as will be discussed below.

Advantageously the method also comprises the step of determining whether the alternative routes use nodes in the vicinity of the failed part, wherein the selecting step is carried out also on the basis of the determined number of nodes used in the vicinity of the failed part. By selecting on the basis of the number of nodes used in the vicinity of the failed part, the selection can be weighted to favour alternative routes which do not use nodes close to the failed part. Where many routes cross the failed part, the amount of spare capacity for restoration may be limited in the vicinity of the failed part. Therefore, favouring alternative routes which avoid the vicinity of the failed part can improve the overall usage of the spare capacity, though it may be appropriate to limit the additional length of the alternative routes which may be a consequence.

Advantageously, the route comprises a virtual path. Virtual paths such as those in an ATM network may be set up for determining the route taken by information passing through the network. As such paths or circuits are created and torn down by the action of software rather than hardware, it is simpler and quicker to create many of them on a temporary basis. This may make restoration more difficult and thus the invention is particularly appropriate for such networks.

Advantageously the method also comprises the steps of: selecting a sender node on one side of the failure, from which the messages are sent; and selecting a chooser node on the other side of the failure to receive the messages, wherein information relating to the determined spare capacities is stored at the chooser node, and the selecting step is carried out by the chooser node. By sending the messages from a sender node on one side of the failure, and performing the selecting step at a chooser node on the other side of the failure, a form of the local centralised processing is used for the restoration. Thus no overall central controller is required, which would be complex and difficult to maintain. The processing can be completely distributed amongst the nodes, which would normally have some processing capability for other purposes. The processing can be made completely adaptive to accommodate changes in network configuration, since no prior knowledge of the network configuration is necessary. Nevertheless, there is local centralised control, since the chooser node gathers information relating to the network around the failed part and can perform the selecting step in view of such knowledge, rather than merely knowledge of its neighbours.

Advantageously, the chooser node is one of the nodes on an original route for the communication before the failure. If the chooser node is on an original route for the communication, it can more easily accommodate parts of the original route in the selected alternative route.

Advantageously, at least one candidate chooser node is identified, also on the original route for the communication before the failure, further from the failed part rather than the chooser, and the messages are also sent to the candidate chooser, to determine possible alternative routes not passing through the chooser. Candidate choosers can take over some of the selection processing requirements for selecting alternative routes not passing through the chooser, and can therefore reduce the amount of processing carried out by the chooser, and can enable better alternative routes, further from the failed part to be chosen.

Advantageously the method also comprises the step of changing the selected alternative route to optimise it. Optimising the selected route may enable spare capacity to be better used. In particular, if selecting the alternative route involves combining three sections, the original route before the failed part, the original route after the failed part, and a bypass section around the failed route, then the bypass part may back track along or close to parts of the original route. Thus it may be possible to optimise the overall route to remove such wasteful backtracking.

Advantageously the method also comprises the step of changing the selected alternative route, to optimise it.

Advantageously the step of optimising comprises the step of reducing the length of the selected alternative route.

Advantageously, the step of optimising comprises the step of avoiding using nodes in the vicinity of the failed part.

Advantageously the method is used for providing alternative routes for multiple concurrent communications, the method comprising the steps of:
allocating a portion of the spare capacity on one of the alternative routes to a first of the communications;
allocating remaining spare capacity, to others of the concurrent communications according to the spare capacity determined at the outset, and the amount of spare capacity already allocated.

According to another aspect of the invention there is provided a method of providing alternative routes for multiple concurrent communications between nodes in a network, following failure of a part of the network affecting the multiple communications, the network comprising a plurality of nodes, and links between the nodes, the method comprising the steps of:

determining the route has failed;

determining alternative routes around the failed part;

selecting at least one of the nodes in the vicinity of the failed part, as a chooser node;

determining an amount of spare capacity on the alternative routes, and using the chooser node to control allocation of the determined spare capacity on the alternative routes to the multiple concurrent communications. Using the chooser node to control allocation enables the restoration processing to be distributed efficiently.

By using the same search messages for determining link capacities, without temporary allocation of capacity, improved restoration of multiple routes can be achieved.

According to another aspect of the invention there is provided a network comprising:

a plurality of nodes and links connecting the nodes, for passing information along a route set up across the network via the nodes, the network further comprising:

means for determining a plurality of possible alternative routes in the event of failure of part of the network;

means for passing messages along the alternative routes to determine a spare capacity of each link in the alternative routes; and means for selecting one of the alternative routes on the basis of the determined link spare capacities.

According to another aspect of the invention there is provided a node for a network, the network comprising a plurality of such nodes, interconnected by links, for passing information along a route set up across the network, the node comprising:

means for determining a plurality of alternative routes in the event of failure of part of the network and;

means for passing messages along the alternative routes to determine the spare capacity of each link in the alternative routes; and means for receiving information relating to the spare capacity of each link, and selecting at least one of the alternative routes on the basis of the received information.

Such preferred features may be combined as would be apparent to a skilled man, and may be combined with any of the aspects of the invention.

BRIEF DESCRIPTION OF THE DRAWINGS

For a better understanding of the invention, and to show how the same may be carried into effect, it will now be described by way of example with reference to the drawings in which.

DETAILED DESCRIPTION

Figure 2:
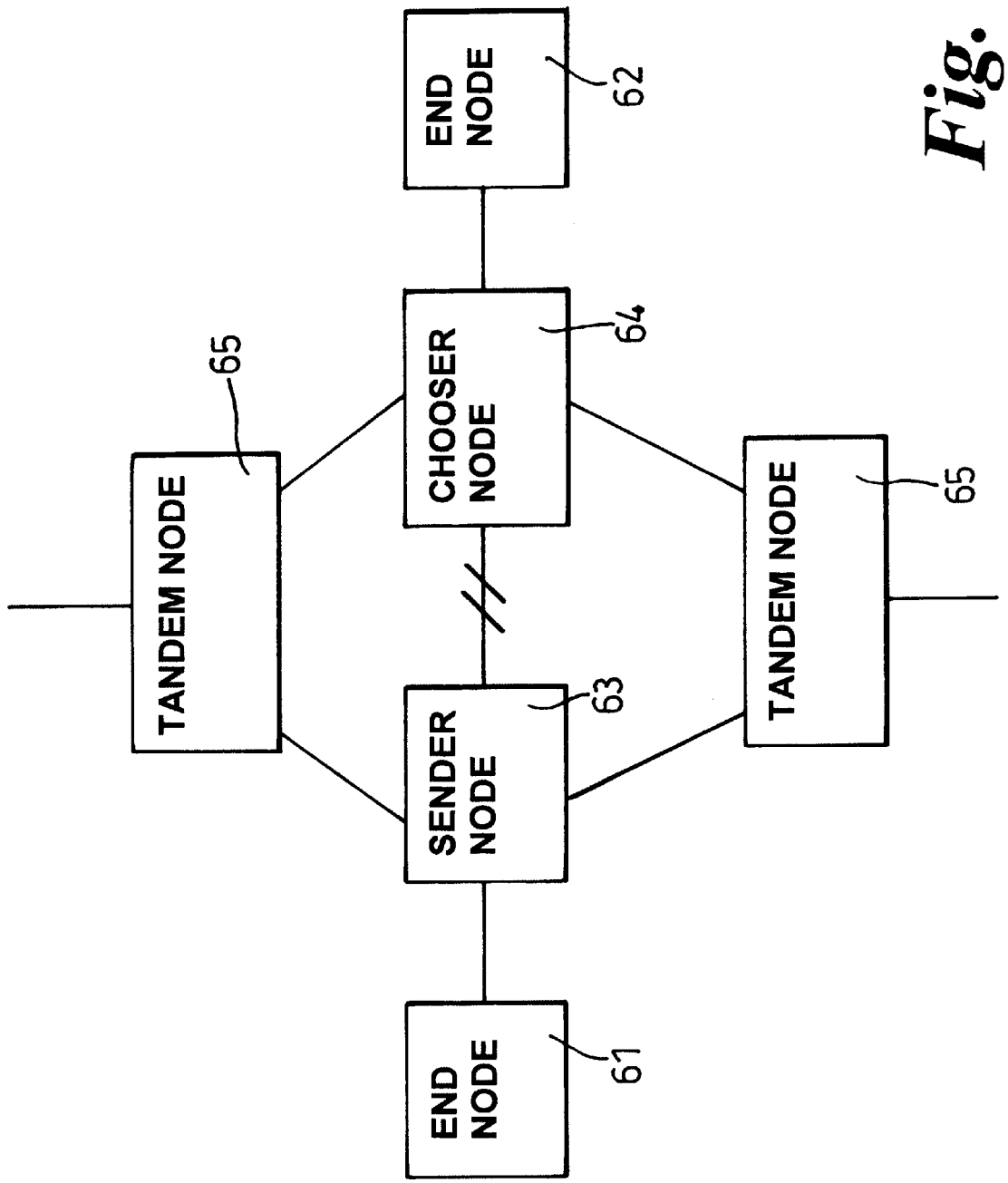
FIG. 2 shows in schematic form a network.
Figure 3:
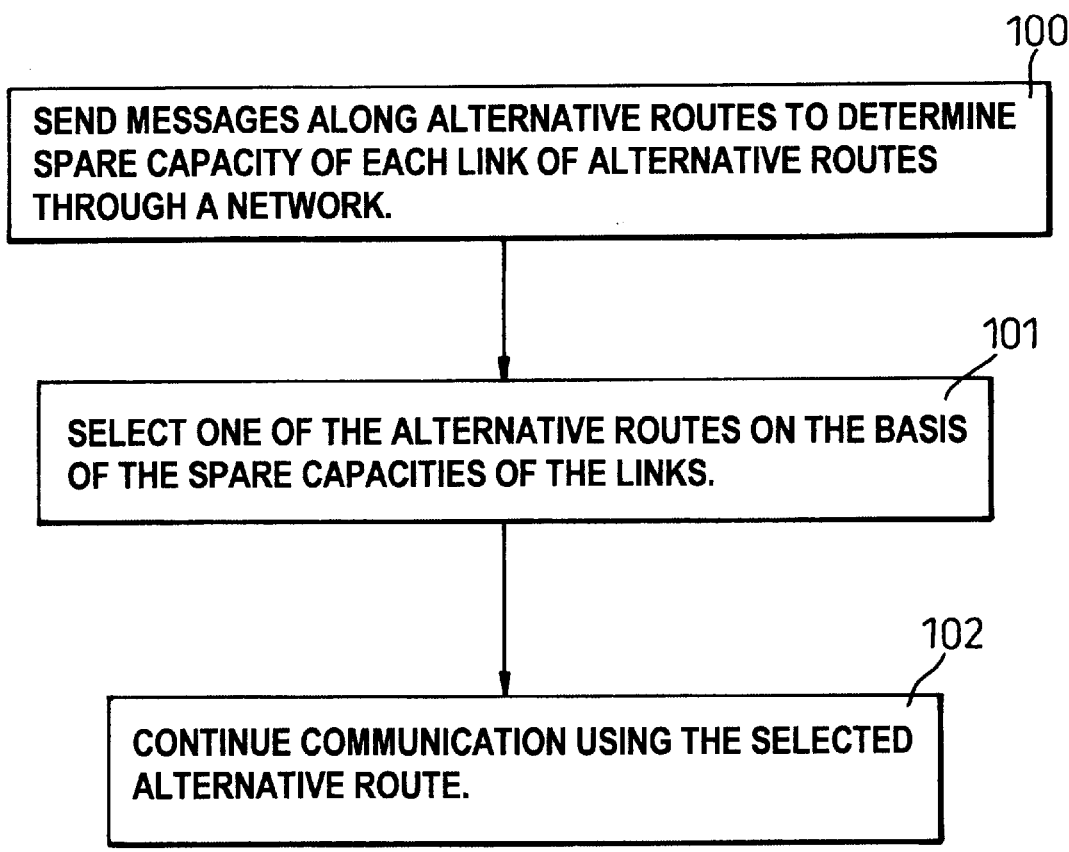
FIGS. 3 and 4 show restoration methods according to the present invention.

FIG. 3 illustrates an embodiment of the invention in schematic form. Messages are sent along alternative routes to determine spare capacity of each link of alternative routes around a broken part of the network at step 100. Thus alternative routes are ascertained on a local basis to avoid the need for preplanning or a centralised control of the search or calculation of alternative routes. With reference to FIG. 2, the alternative routes from the end node 61 to end node 62 may be via sender node 63, tandem node 65, chooser node 64 and end node 62.

Step 101 of FIG. 3 involves selecting one of the possible alternative routes on the basis of the spare capacities of the links. Communication may be continued using the selected alternative route as shown at step 102.

Figure 4:
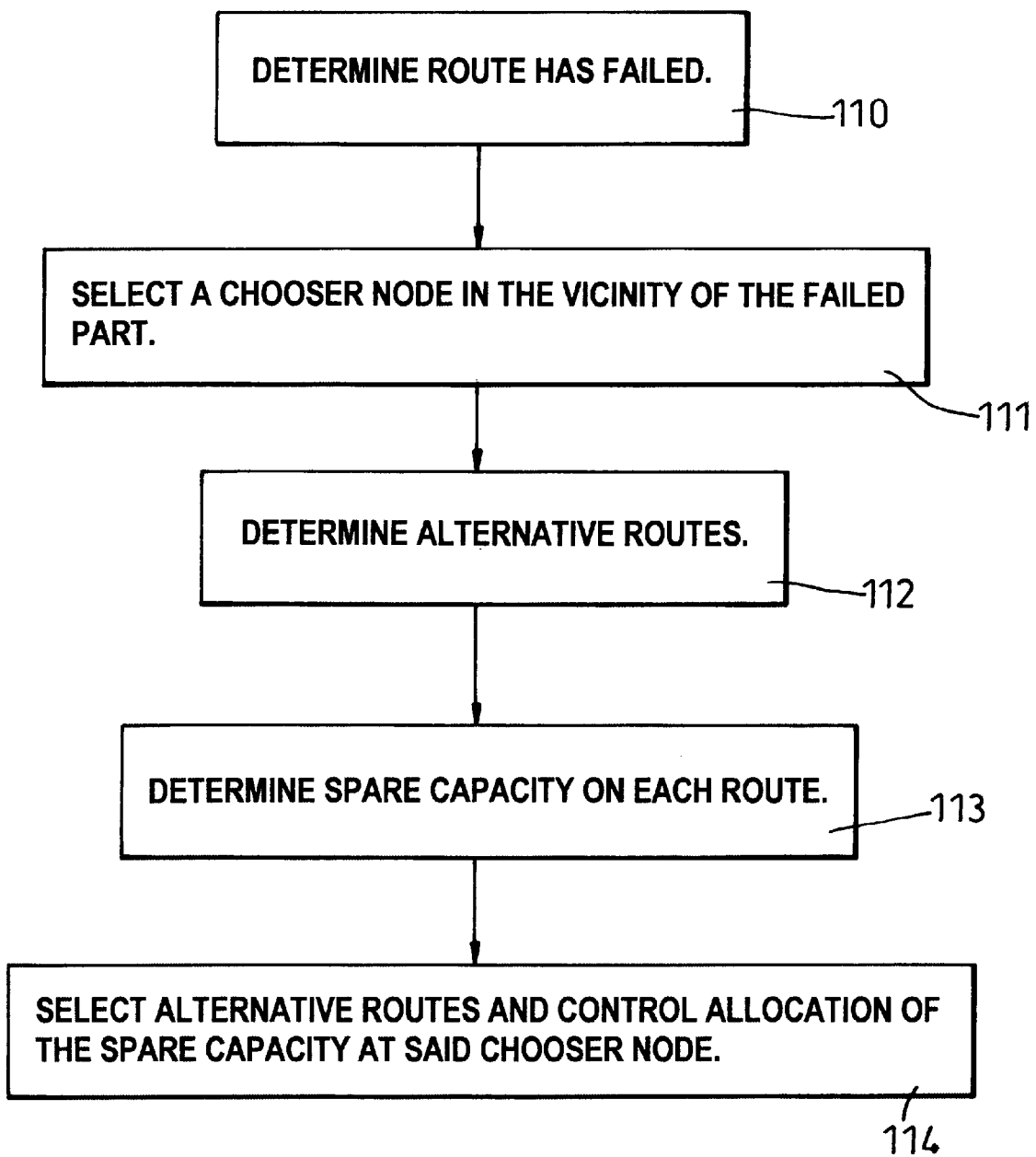

Another aspect of the invention is illustrated in schematic form in FIG. 4. At step 110 it is determined that the route has failed. At step 111 alternative routes are determined. At step 112, a chooser node 64, as shown in FIG. 2, is selected in the vicinity of the failed part. At step 113 spare capacity on each of the possible alternative routes is determined.

Figure 1:
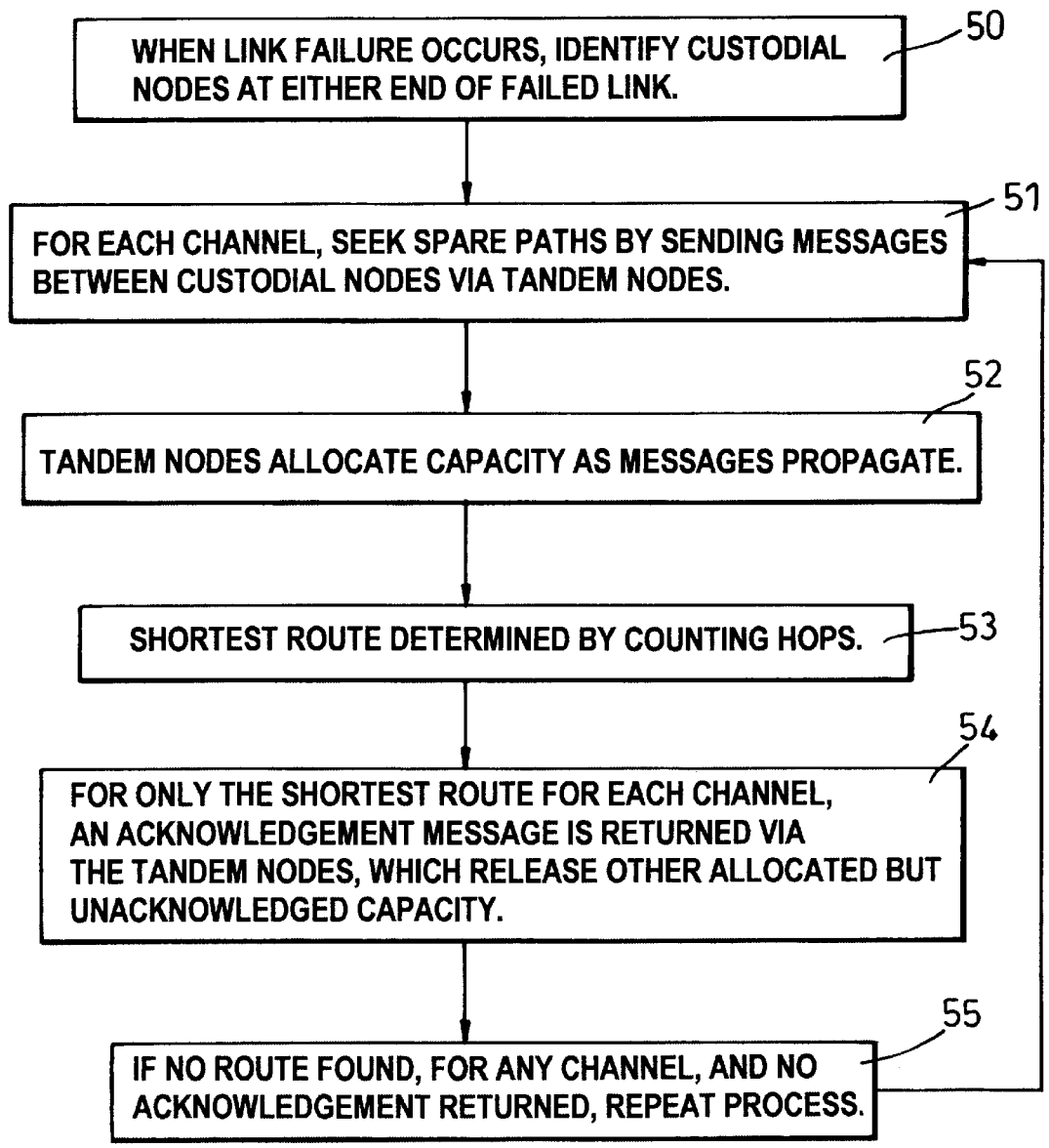
FIG. 1 shows a known restoration method.

Finally, at step 114, one or more of the alternative routes is selected, and allocation of the spare capacity on this selected alternative route is controlled by the chooser node 64. In comparison with the prior art method of FIG. 1, there is locally centralised control of the allocation of the spare capacity on the allocation of the spare capacity on the alternative routes by the chooser node, which enables more efficient allocation, and avoids blocking caused by temporary allocation by tandem nodes.

Description of Nodes of the Network

Figure 5:
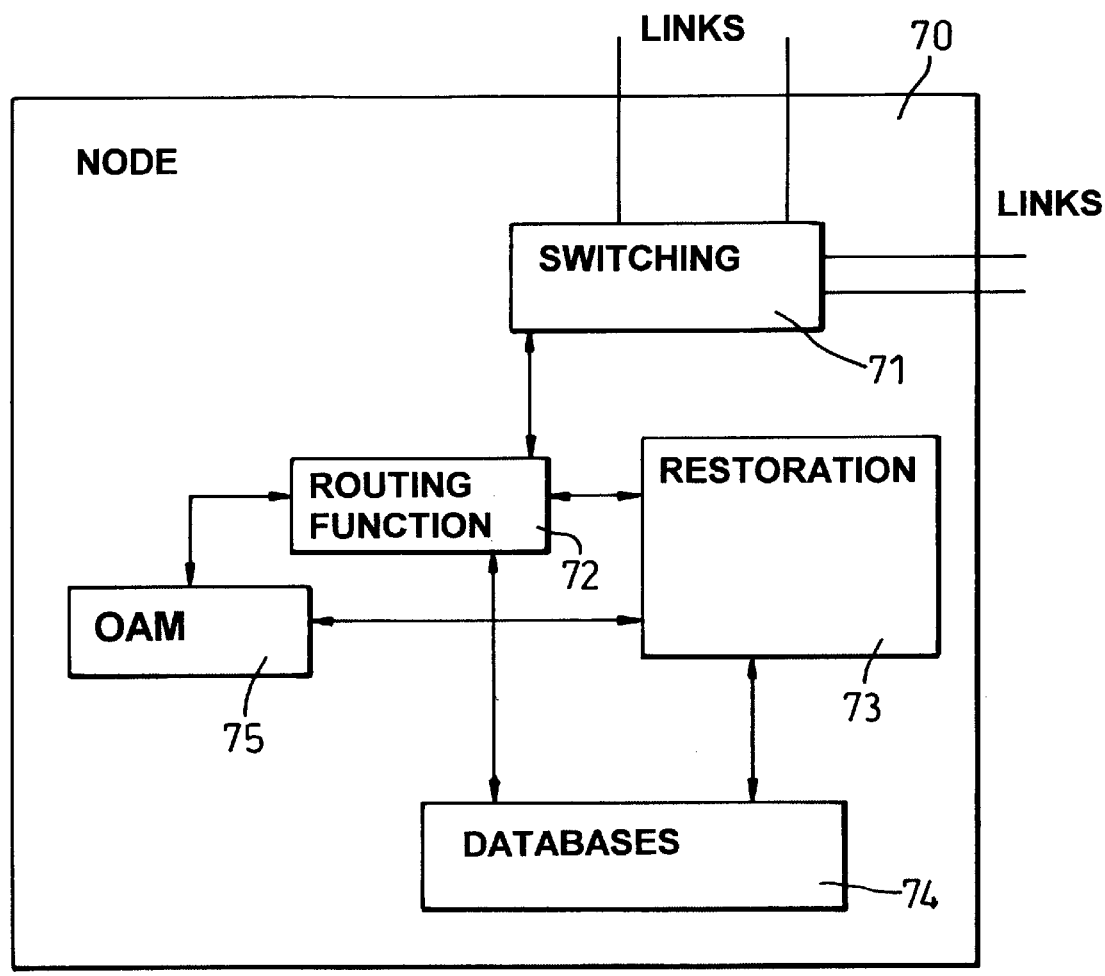
FIG. 5 shows in schematic form the internal structure of a node for use in the network of FIG. 2.

FIG. 5 illustrates in schematic form a node for use in the methods described above. Preferably, each node 70 should be able to perform the function of an end node 61, 62, which may comprise network terminating equipment for converting a communication into the protocols used by the network. The functions of such an end node will not be described in more detail as an implementation appropriate to the type of network protocol being used would be realisable by a person skilled in the art. The node 70 shown in FIG. 5 should also preferably be able to perform the functions of the sender node 63, the chooser node 64, and the tandem node 65. These functions can be summarised as restoration functions, shown in element 73 of the node 70. Switching functions for passing communications between links are shown by element 71. The switching functions are controlled by routing functions 72, which refer to databases held locally, indicated by reference 74. Operations, administration and maintenance functions (OAM) are shown by element 75.

In practice, the switching function 71 is often carried out by dedicated hardware, to maximise the speed of operation. The routing, restoration and OAM functions may be carried out by a single conventional processor, or by multiple conventional processors.

The invention may be applied to optical hierarchy transport networks based on SONET, but is particularly advantageously applied to ATM networks or frame relay networks. These latter two types are cell oriented, with virtual circuits in the case of frame relay, and virtual paths (VPs) and groups of the VPs called virtual connections (VCs) being set up between end nodes, so that all the packets for a given communication or portion of a communication pass along the same route. Where the communications include telephone calls, a virtual path would be set up at the outset of the call, cells passed along the virtual path during the call, in both directions. At the end of the call the virtual path is torn down. Thus there may be many virtual paths established on a link at any one time.

The switching function 71 of the node 70 in FIG. 5 will read the virtual path identifier from each ATM cell arriving at the node. The switching function will refer to a routing table held in the database section 74, via the routing function 72. The routing table will indicate which link is used by the appropriate virtual path, and will send the packet onward on that link.

Figure 6:
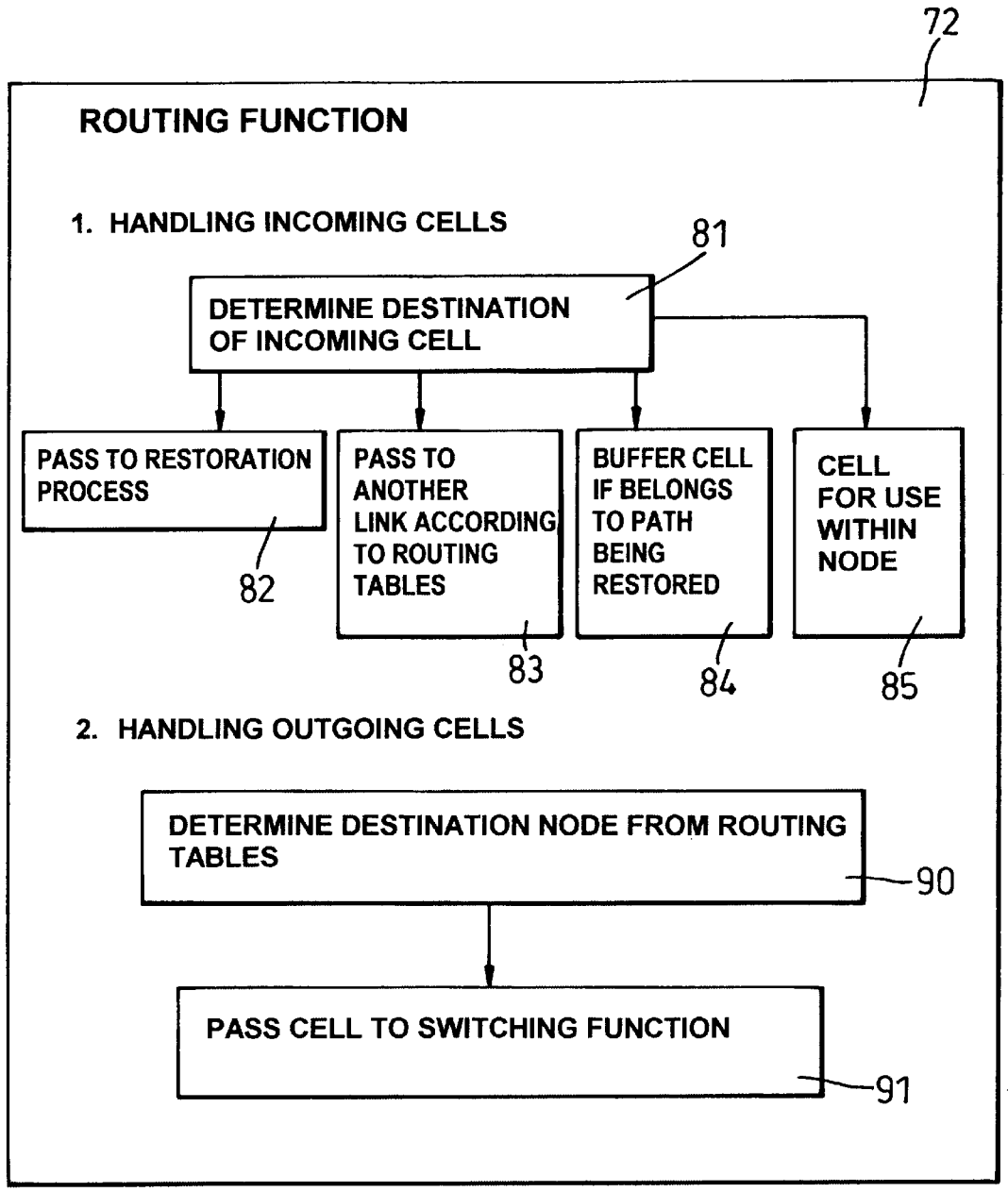
FIG. 6 shows in schematic form the routing function of the node of FIG. 5.

The routing function will now be described with reference to FIG. 6. For incoming cells, step 81 shows that the decimation of the cell must be determined. According to the VPI (Virtual Path Indicator) in the cell, or other indicator of the destination or purpose of the cell, the routing function may pass the cell to the restoration process (step 82). Alternatively, it may pass the cell onto another link according to routing tables as described above (step 83). If the cell belongs to a path being restored, it may be buffered as shown in step 84, while if the cell is for use by an application running on the node, or is used by the OAM function, it will be routed within the node, at step 85.

Outgoing cells may be dealt with by the routing function by determining a destination node from routing tables at step 90. According to the content of the routing table, the cell will be passed to an appropriate part of the switching function 91 for onward transmission on a given link.

Figure 7:
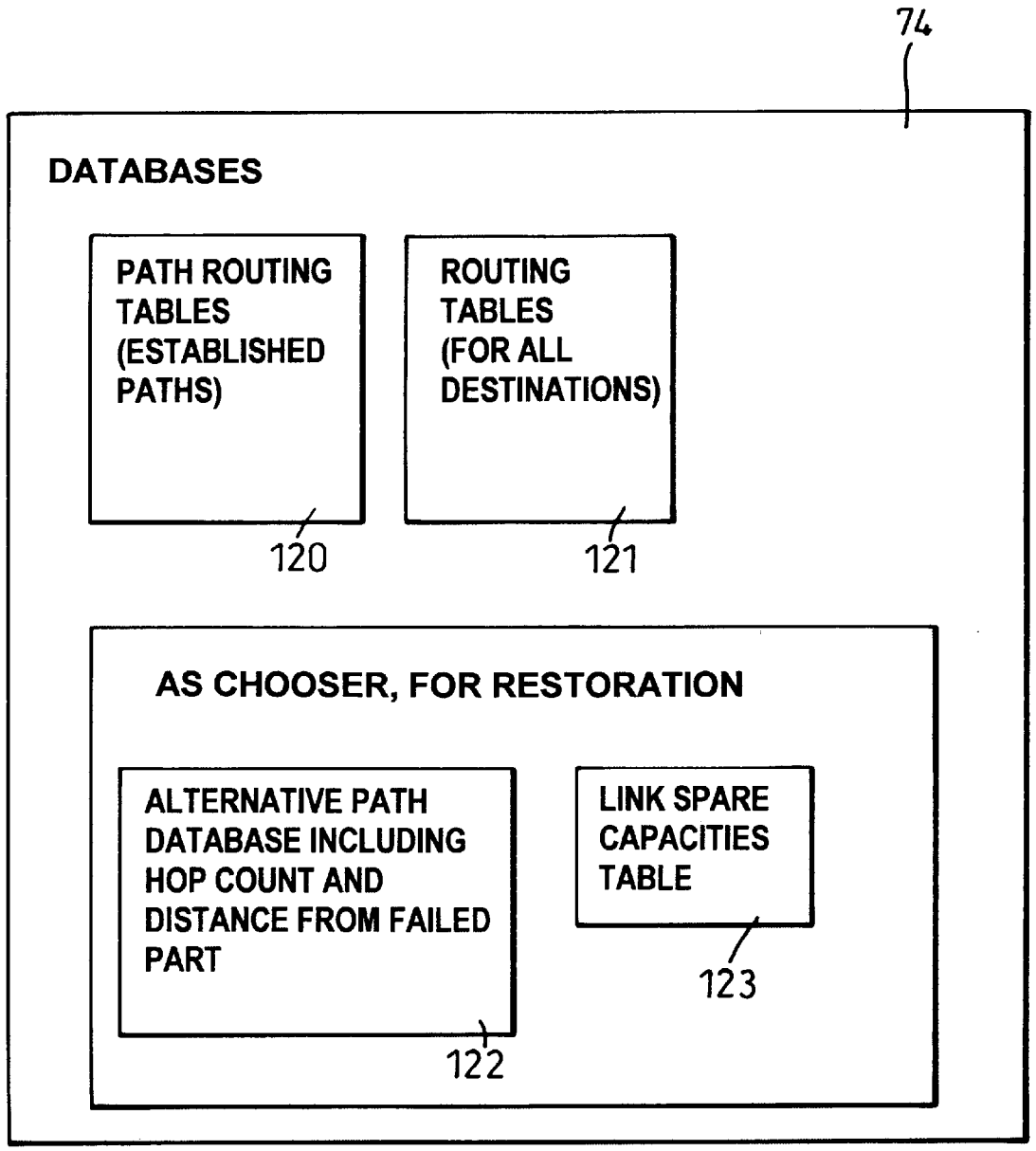
FIG. 7 shows in schematic form the databases of the node of FIG. 5.

The databases 74 shown in FIG. 5, will now be discussed with reference to FIG. 7. Path routing tables 120 are shown for keeping track of established virtual paths. Routing tables for all destinations, 120 are also used. The routing function will make use of these tables in the normal operation of the node.

Two other databases 122 and 123 are shown specifically for restoration purposes, for use by the restoration function, when the node is acting as a chooser. Firstly an alternative path database is maintained, with an entry for each alternative path found by the searching messages sent out by the sender. Each entry will include at least a hop count for the given alternative path, in terms of the number of nodes on the route. Furthermore, an indication of the distance of the nodes from the failed part may also be recorded. This "score" for each of the possible alternative routes will be discussed in more detail below, with reference to FIG. 18.

Other parameters of the possible alternative routes may be recorded and stored, to assist the chooser in selecting optimum alternative routes around failed paths.

Figure 8:
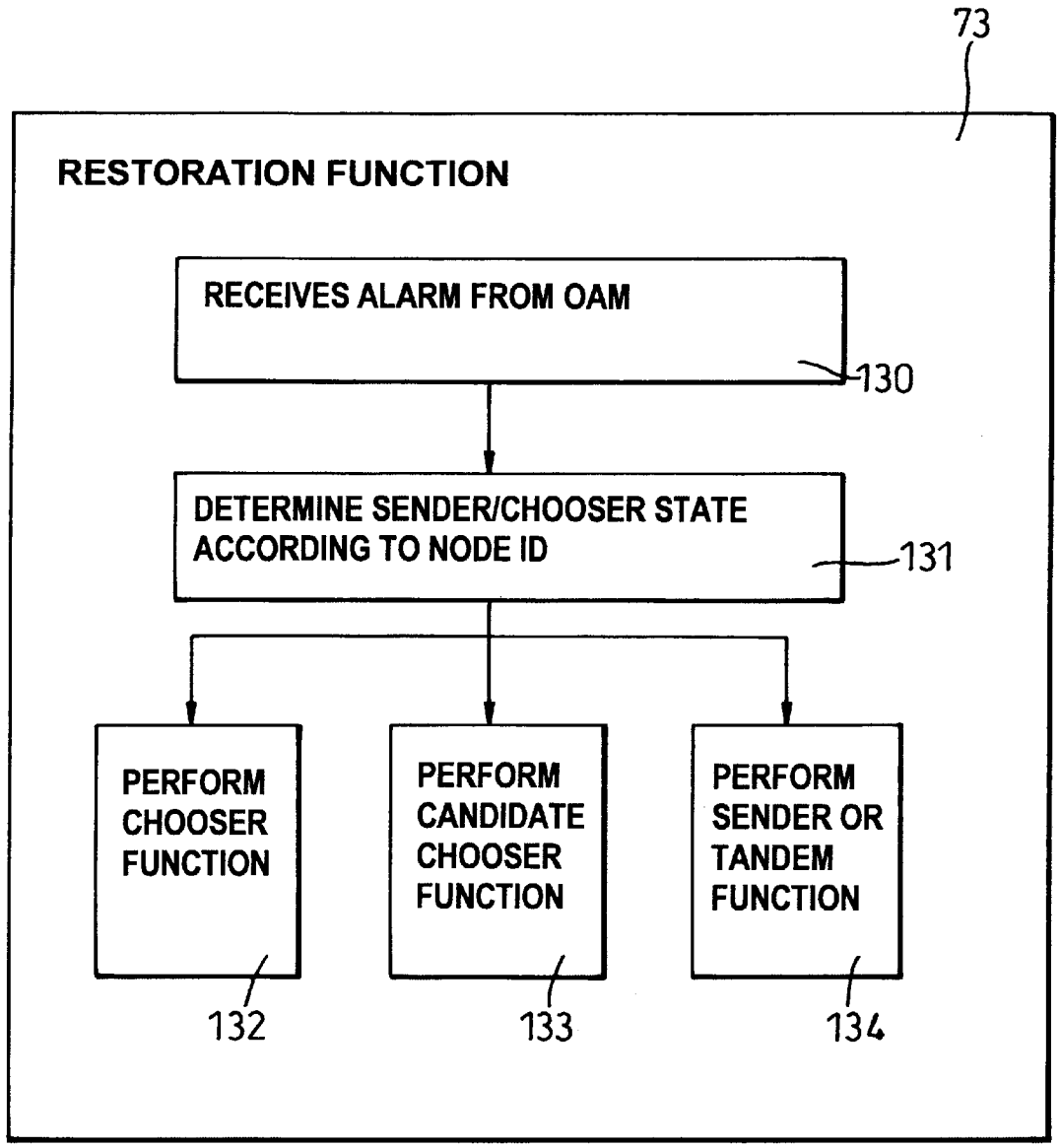
FIG. 8 shows the restoration function of the node of FIG. 5.

FIG. 8 illustrates in schematic form the restoration function 73. Typically, the OAM function monitors the state of links around the node, and determines if a link has failed. The restoration function therefore receives an alarm indication from the OAM at step 130. The nodes at either side of the failed link, or failed part, will raise alarms, and commence restoration. The nodes at each side of the failed part will be termed "custodial nodes". The custodial nodes will be aware of the virtual paths which use the failed link, since each node maintains path routing tables 120.

The next step is to determine which of the pair of custodial nodes should be sender and which should be chooser, as shown in step 131 of FIG. 8. Where each of the custodial nodes knows the node ID of the other custodial node, the sender/chooser choice can be made by reference to the node IDs. For example, the higher node ID could be the chooser. At this point, no alternative route has been found, so the determination should be made independently. There may be an advantage in choosing as the chooser node the node with less spare capacity on its remaining working links. This is because the worst bottle neck for restoration is likely to be the final hop to the sender or to the chooser. As the chooser can be bypassed by using candidate choosers as will be discussed below with reference to FIGS. 14 and 15, overall, better restoration performance may be achieved if the bottleneck around the sender is reduced by appropriate choice of the sender and chooser.

As shown in FIG. 8, the next step is to perform the functions of the sender or chooser as appropriate, or the functions of candidate chooser or tandem node, as set out in steps 132, 133 and 134 in FIG. 8.

Description of Chooser Node Function

Figure 9:
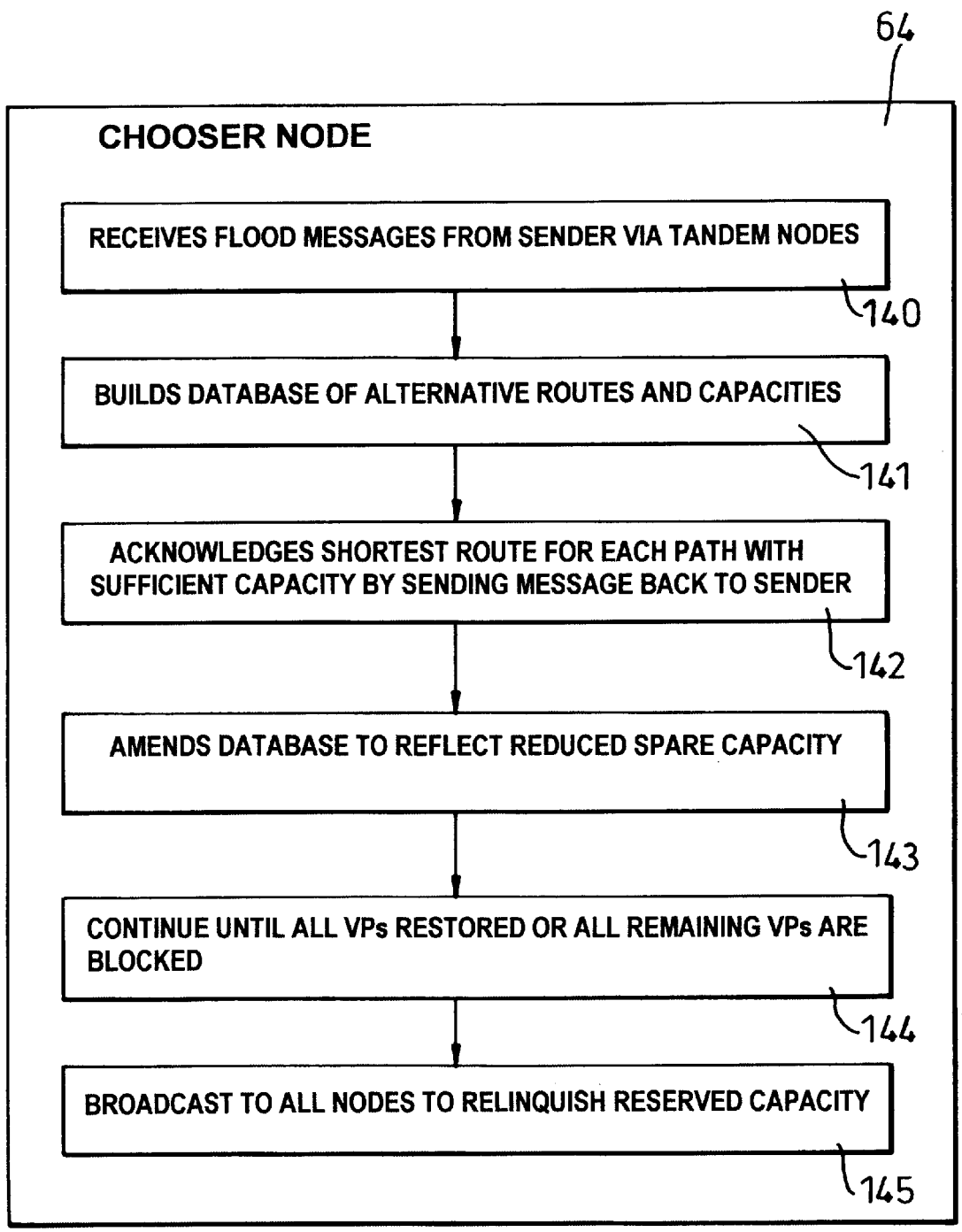
FIG. 9 shows the operation of the chooser node in the method of the invention.

With reference to FIG. 9, the basic functions of the chooser node are illustrated in schematic form. The chooser node receives many search messages from the sender via tandem nodes, at step 140. The flooding instance of messages searches out all spare capacity between the sender and chooser, but does not assign any capacity to a specific path, unlike previous methods. At step 141, the chooser node builds a database of the possible alternative routes, including at least the hop counts of each route, the spare capacity of each link on the route, and other parameters which may assist in enabling the chooser to select the most appropriate alternative route for each virtual path affected by the failed link. To restore the affected virtual paths, the chooser can begin assigning capacity as soon as the first complete path arrives. Assignment depends on the particular assignment algorithm used. Various types of assignment algorithm are conceivable, with differing results in terms of efficiency of use of the spare capacity. A simple FCFS (First Come First Served) algorithm assigns virtual paths to spare capacity in a random fashion as soon as the capacity is identified by receipt of flood messages from the sender.

The chooser acknowledges the shortest route for each path with sufficient capacity for the path, by sending a message back to the sender, at step 142 of FIG. 9. The database of alternative routes can be amended to reflect the reduced spare capacity available for other virtual paths, at step 143. The chooser continues through its list of affected virtual paths, until all have been restored, or until all remaining virtual paths are blocked by a lack of spare capacity on alternative routes, as shown at step 144.

At step 145, the chooser node broadcasts to all nodes to relinquish any spare capacity still being reserved for the restoration process. Clearly this would occur only once all the affected virtual paths have been restored.

Any new virtual paths to be set up during the duration of the failure in the link would be re-routed to avoid the failed part. This would normally be carried out not as part of the restoration process using alternative routes identified by the flood messages, but by altering the routing tables in nodes in the vicinity of the failed part, and perhaps over a wider area.

Other possible assignment or allocation algorithms include FCFS with loop elimination, and FCFS with loop elimination and delay. Loop elimination will be discussed in more detail below with reference to FIGS. 19 to 22. Briefly stated, before assigning capacity (or afterwards), a message is sent along the path to identify cross-over points where the path crosses over itself. This may be complex if the path comprises three parts, original sections of the virtual path before and after the failed part, and a third bypass part which joins the two broken sections, around the failed part. The loop elimination message may bypass the loops at the cross over points, then pass around the bypassed loop to relinquish the capacity of each of the links in the loop. Finally the loop elimination message may return to the chooser to inform the chooser of the relinquished capacity so that it may be reassigned to other virtual paths for the purpose of restoration.

To enhance the effect of loop elimination, if a delay is included, then other restoration paths with a hop count less than the current hop count may be prevented for a given time period. The hop count of the current shortest path may be lowered when all the loops have been eliminated from the restored paths which are longer or equal in length to the current restoration path length. If the delay is sufficient for all loop elimination messages to be returned, then the assignment algorithm can be allowed to continue with the shortest loop free restoration path. The maximum delay for the loop elimination process can be estimated and an accurate time out value given in case a loop elimination instance fails. This can provide fail safe operation in case a message becomes corrupted or lost.

Description of Tandem Node Operation

Figure 10:
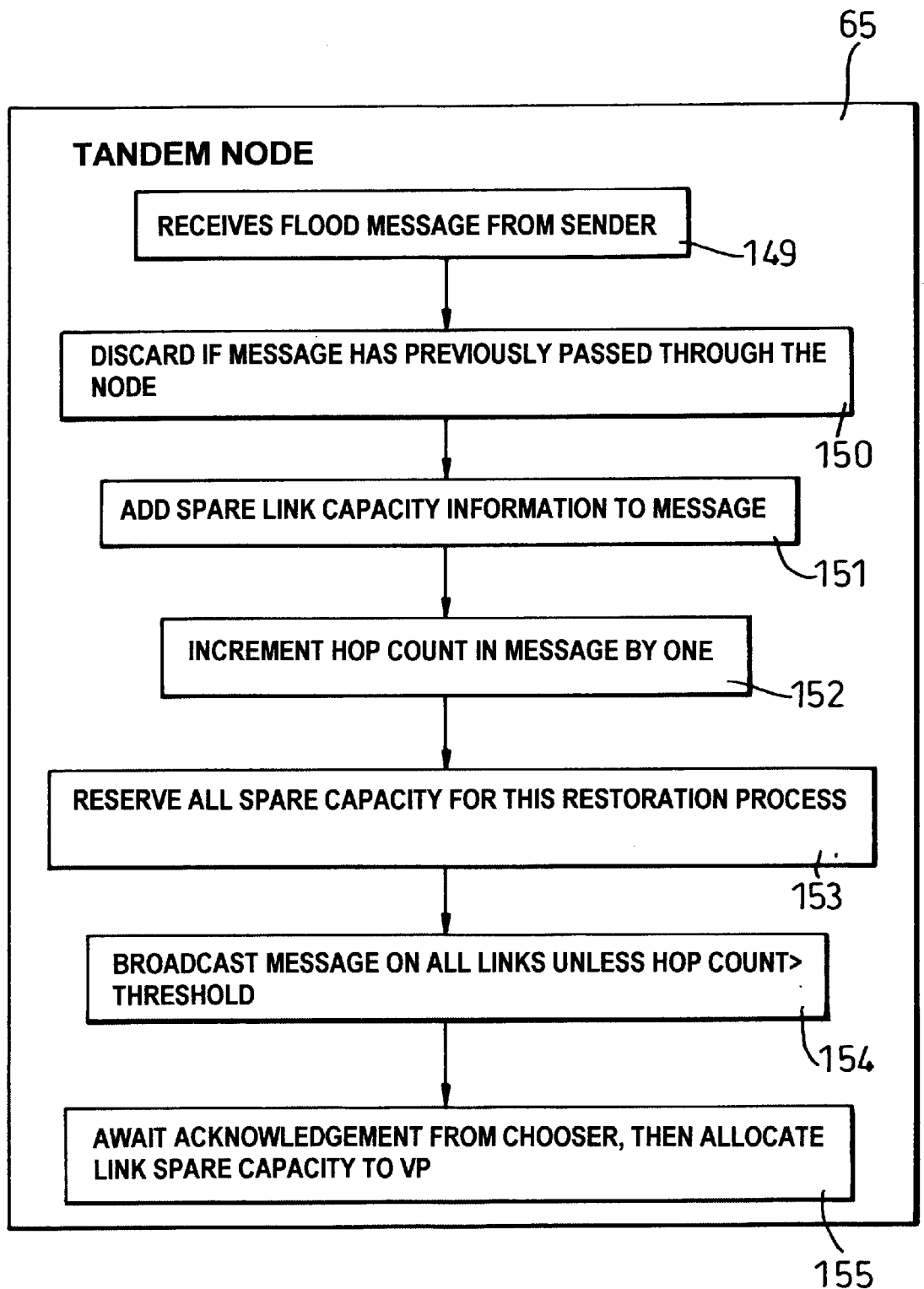
FIG. 10 shows the function of the tandem node in the method of the invention.

With reference to FIG. 10, a tandem node is unaware of the failed part until it receives a flood message from a sender at step 149. At step 150, the message will be discarded if it has previously passed through the tandem node. It is in the nature of flood messages that are passed by each node to every outgoing link, that some messages will go in a loop and return to the same tandem node. To enable such messages to be discarded, each message will record the nodes through which it passes. Alternatively, the node may store which flood messages it has seen and passed on.

At step 151 the tandem node will add information on the spare capacity of its links, to the message. At step 152 the hop count in the message is incremented by one. At some point, as shown in step 153, the tandem node will reserve all spare capacity for this restoration process. Each of the flood messages has an indicator of which restoration process it is related to, in case there are multiple failures in the same area of the network. Spare capacity may be shared between restoration processes, as will be discussed below. The node records the amount of spare capacity for that restoration process, to ensure that other messages belonging to the same restoration process are forwarded with the same value of spare capacity.

At step 152, the flood message is broadcast by the tandem node on all other links, unless the hop count is greater than a given threshold. This limit to the hop count enables the range of the flood messages to be limited, so as not to clog the network. The limiting hop count can be chosen according to a desired length of alternative route.

At step 155, the tandem node awaits acknowledgement from the chooser and only then allocates some spare capacity to the virtual path, as requested by the virtual path.

Even if there is no capacity to be assigned, the tandem node will record this and pass it on in the broadcast flood message, so that the database in the chooser node reflects the lack of spare capacity.

Description of Sender Node Operation

Figure 11:
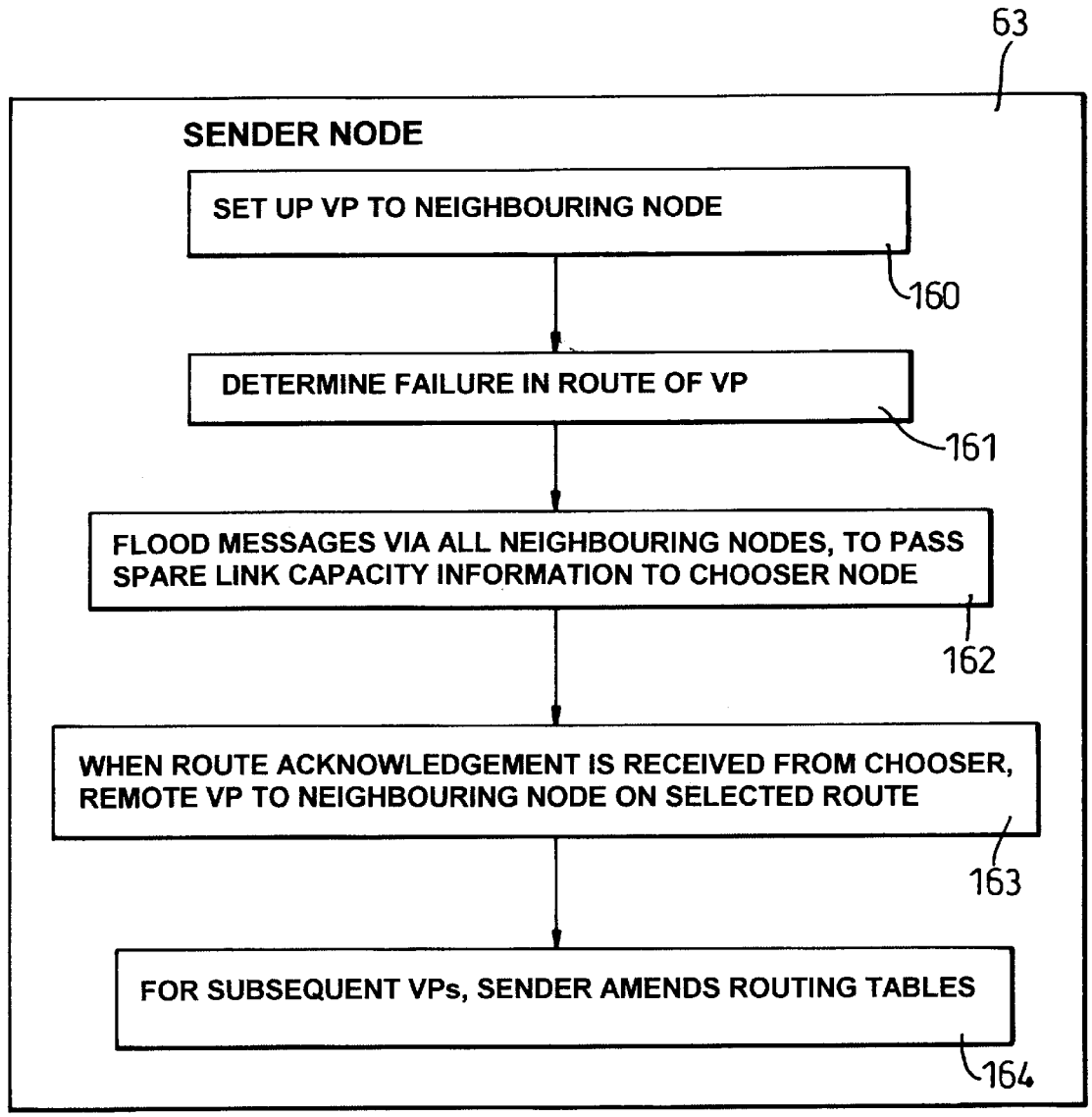
FIG. 11 shows the function of the sender node in the method of the invention.

With reference to FIG. 11, the functions of the sender node are set out in schematic form. At step 160 the virtual path is set up to a neighbouring node. A failure in the route of the virtual path is detected at step 161. At step 162, the sender floods messages via all its neighbouring nodes, to find alternative routes to the chooser node, and to pass spare capacity information on the links of those alternative routes, to the chooser node. Only when a route acknowledgement is received from the chooser, at step 163, does the sender reroute the virtual path along the selected route, by altering its routing tables. The routing tables in the sender are also changed to ensure that subsequent virtual paths are set up away from the failed part. Like the chooser, the sender may alert other nodes to amend their routing tables for destinations previously served by the failed link, to ensure that subsequent virtual paths avoid the failed part.

Multiple Link Failure

Multiple link failure is a complex issue in this algorithm since all the spare capacity is likely to be assigned to one restoration instance. Obviously all the capacity should be assigned to one process if only one process exists. However, deadlock must be avoided whether processes execute, either simultaneously or at separate times.

The quantity of spare capacity available limits any restoration algorithm when two or more links fail. It is suggested that a mechanism exists for a restoration instance to retry after a specific time if another restoration instance has been detected to be executing. This would not prevent the algorithm from attempting an initial restoration search, although when the process is complete another search could take place.

If the two algorithms start simultaneously then a mechanism should exist for both algorithms to pull back and perform either a restoration with capacity divided between the failures, or one process should back off to allow the other to finish. The first method would then make it possible for the two algorithms to create separate flood-searching instances limiting the tandem nodes to assign a set fraction of their spare capacity to each algorithm. The second method increases the restoration time for the delayed restoration instance.

Node Failure

Obviously the first step in dealing with nodal failure is for the neighbouring nodes to determine that it is a node failure and not a link failure; this is discussed in more detail in Fujii H. and Yoshikai N., "Restoration Message Transfer Mechanism and restoration Characteristics of Double-Search Self-Healing ATM Network", IEEE J. Select. Areas Commun., vol 12, no. 1, pp. 149–157, January 1994. It is recommended that once the nodes have recognised the failure as a node, they contain enough information to determine which VPs are destined for each 'end hop' node. The term 2nd refers to the node two hops away backwards or forwards. It would be beneficial to create several sender/chooser instances between the custodial nodes such that all nodes have one sender/chooser instance with each other. This could be achieved as follows, where the failed node is called the suspect node.

Figure 12:
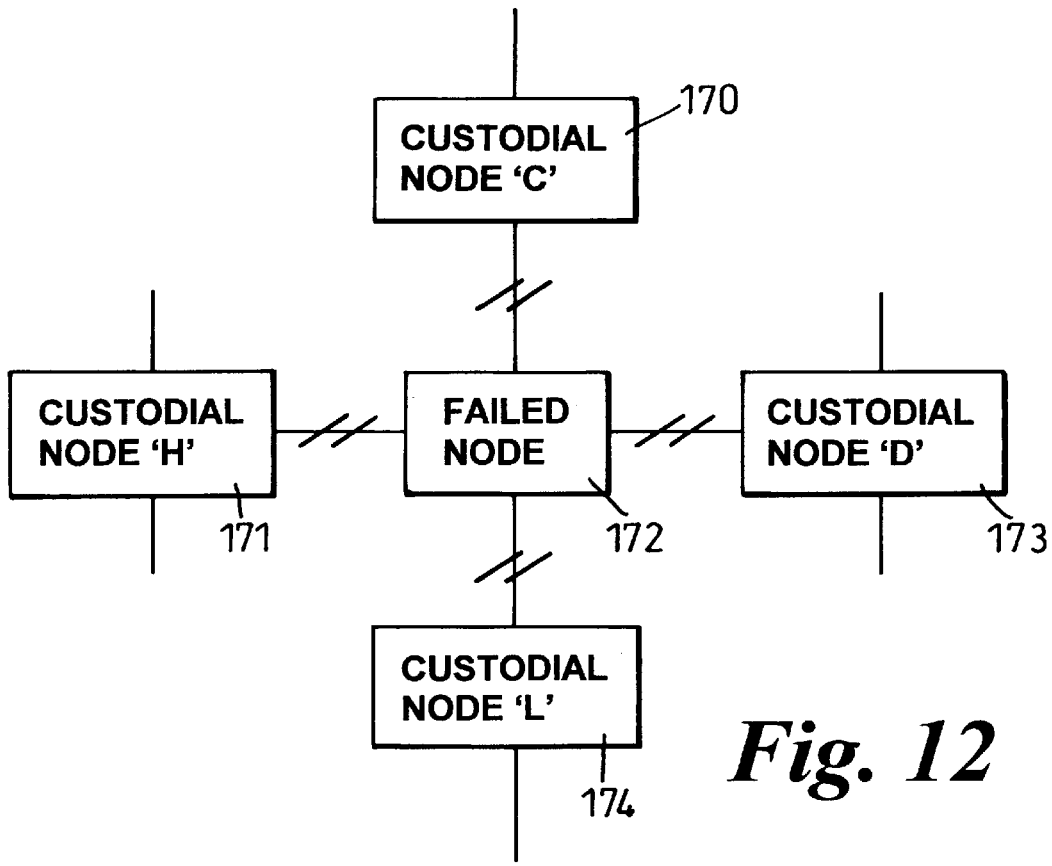
FIG. 12 shows a network including a failed node.

When a custodial node has identified the suspect node as inoperable it orders itself with the other custodial nodes; i.e. all other nodes in the node's 2nd hop table entry. Every node has a relative position in the 'custodial node sequence list' with respect to its node ID. The sequencing is such that the custodial node with the highest ID is the first node and the custodial node with the lowest ID is the last node. For example, if the custodial node sequence list is C, D, H, L, as shown in FIG. 12, each custodial node has a sender state for every other custodial node lower in the sequence list. In the same manner each node has a chooser state for every custodial node higher in the sequence list. For this example table I shows the sender/chooser states:

TABLE 1

| | Sender/chooser states | |
|---|---|---|
| Node | Sender State for | Chooser State for |
| C | D, H & L | None |
| D | H & L | C |
| H | L | C & D |
| L | none | C, D & H |

Figure 13:
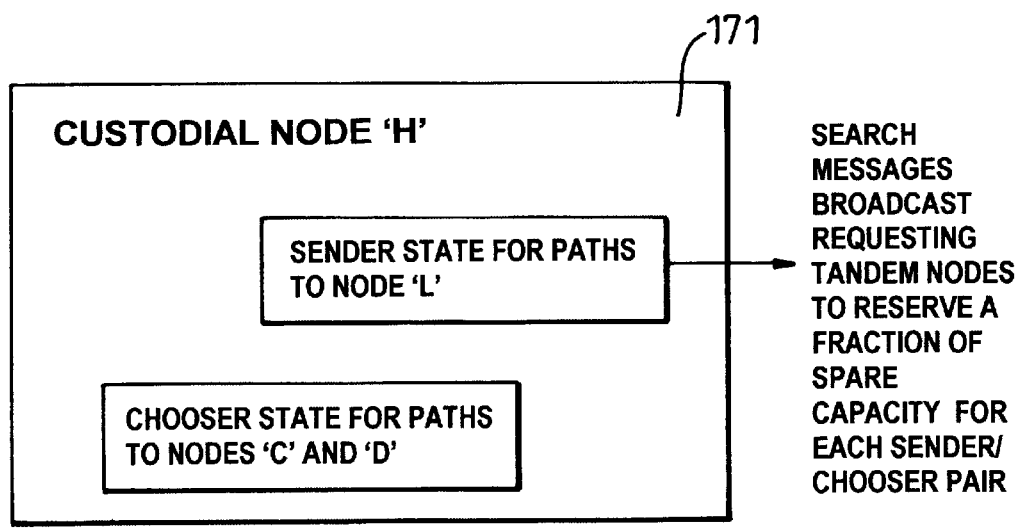
FIG. 13 shows in schematic form the custodial node "H" of FIG. 12.

Thus all sender states create flood-searching instances to each chooser state in its table. During the searching instances each tandem node reserves a fraction of the capacity with respect to the number of sender/chooser pairs. This information can be held in the search message and is equal to $$\sum_{\chi=1}^{N-1} (N - \chi) = \frac{1}{2} N \cdot (N - 1) \quad (1)$$

where N is the number of custodial nodes. The process of acknowledging capacity and performing loop elimination is the same as that described above. FIG. 13 shows how a custodial node should be able to act as chooser and sender for the various restoration processes for respective sender/chooser pairs.

Candidate Choosers

Figure 14:
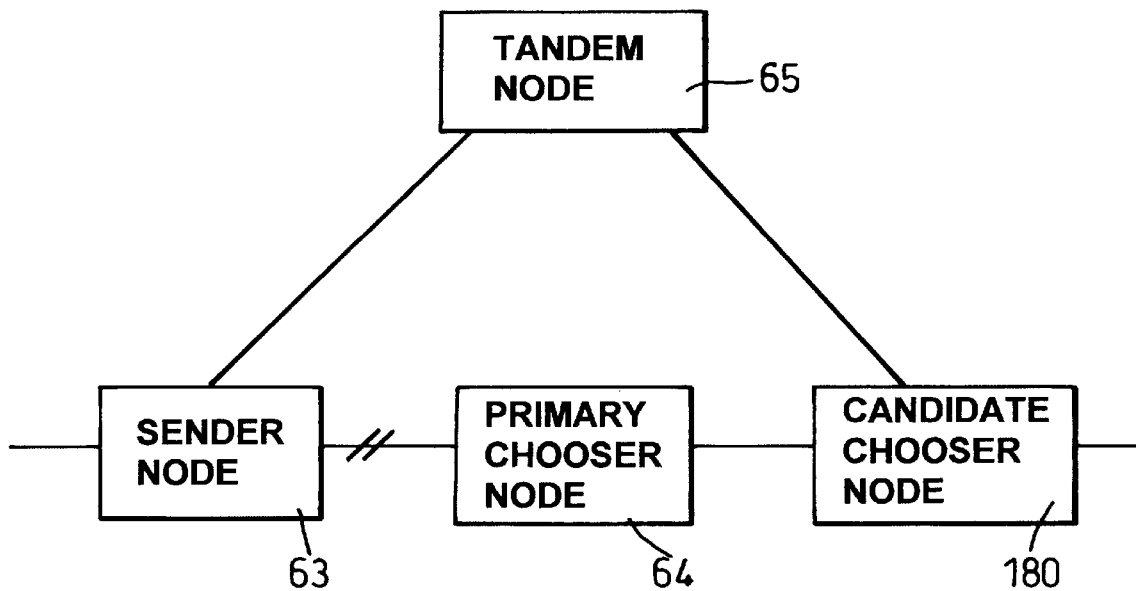
FIG. 14 shows a network including a candidate chooser node and a primary chooser node.
Figure 15:
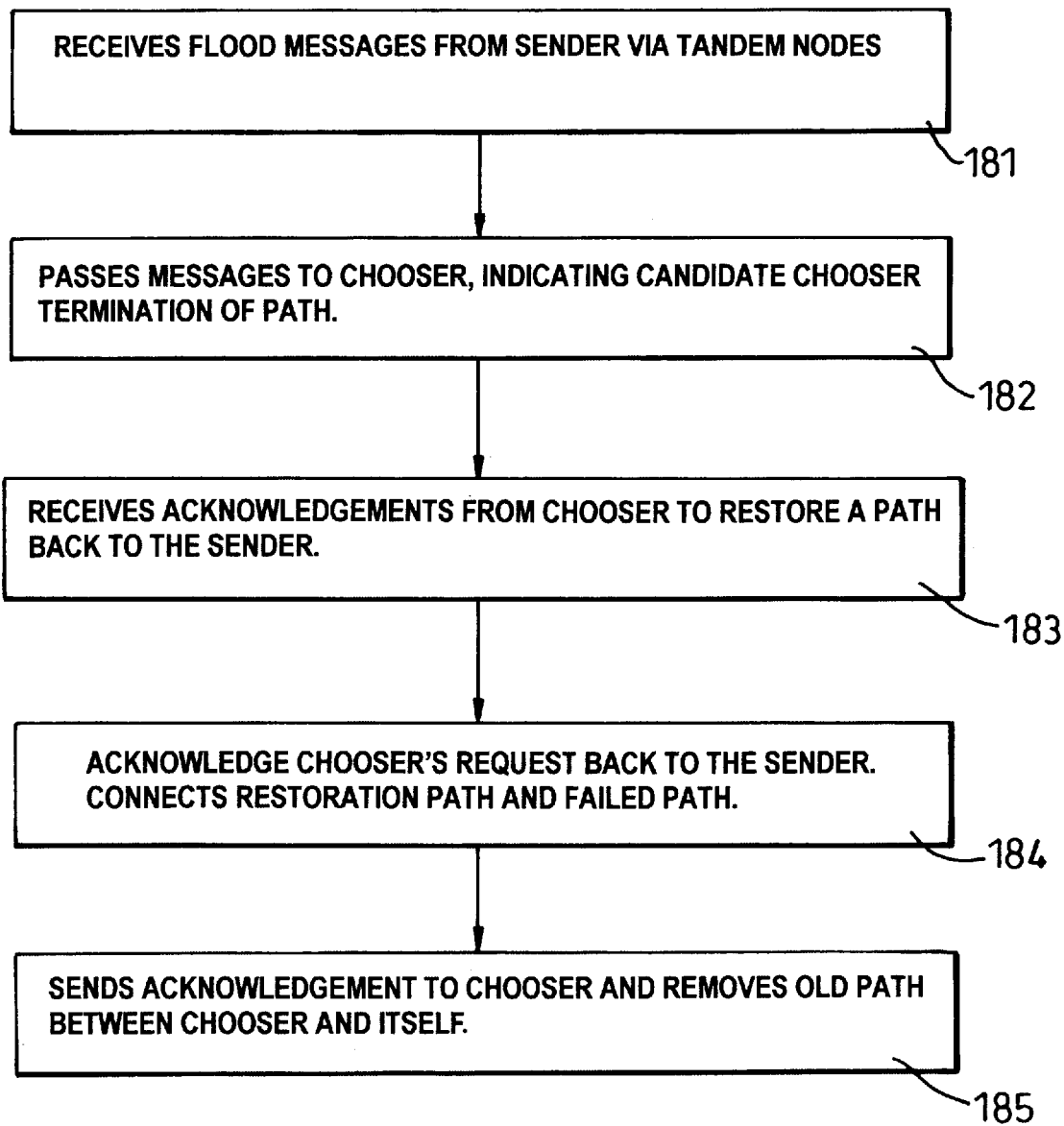
FIG. 15 shows in schematic form some of the functions of the candidate chooser.

To avoid a bottle neck around the chooser node 64, some of its functions can be delegated to a candidate chooser node 180, as shown in FIG. 14. Selected alternative paths may bypass the chooser node, and its operation will be described with reference to FIG. 15. At step 181 it receives flood messages from the sender via tandem nodes. These messages are passed to the primary chooser, 64, indicating the candidate chooser termination or the bypassed path around the failed part.

At step 183, the candidate chooser receives acknowledgement from the chooser to restore a path back to the sender. The candidate chooser acknowledges the primary chooser's request back to the sender, and connects the restoration bypass path, and the original failed path, at step 184. Finally, an acknowledgement is sent to the chooser, and the old path between the primary chooser and the candidate chooser is relinquished, to be made available for other restoration paths.

The bottle neck avoided by the candidate chooser can be described in terms of a cutset.

A outset is a set of links that, when removed, divides a graph into two. For the restoration process, the outset that separates the sender and the chooser with the least capacity is the limiting factor (minimum outset), if loop elimination is not implemented in the network. The minimum outset will probably exist around the custodial node with the smallest outset capacity, within one hop. Given that either custodial node can be the primary chooser, the minimum outset will probably be increased by selecting the node with the least outset capacity as the primary chooser to which candidate choosers can then be assigned. During restoration, the primary chooser maintains a database of all information related to the restoration. The concept of candidate chooser is different from prior methods in that the sender creates a single flooding instance between each candidate chooser and the primary chooser. To implement this, the sender requires the node identification of all 2nd hop nodes. For all search instances the tandem nodes inform the chooser (candidate or primary) of the same spare capacity. When a candidate chooser receives messages for itself, it informs the primary chooser of the received information. From the database the primary chooser identifies failed VPs passing through that candidate chooser and the amount of spare capacity available for its restoration. The primary chooser informs the candidate chooser of any restoration process. Upon completion it is the function of the candidate chooser to initiate any loop elimination processes and inform the primary chooser of any relinquished capacity.

If the chooser has been selected to have the least number of neighbouring nodes, the concept of candidate choosers helps eliminate the most probable minimum outset. In principle, the same concept can be envisaged for the sender side.

Optimisation Considerations

Figure 16:
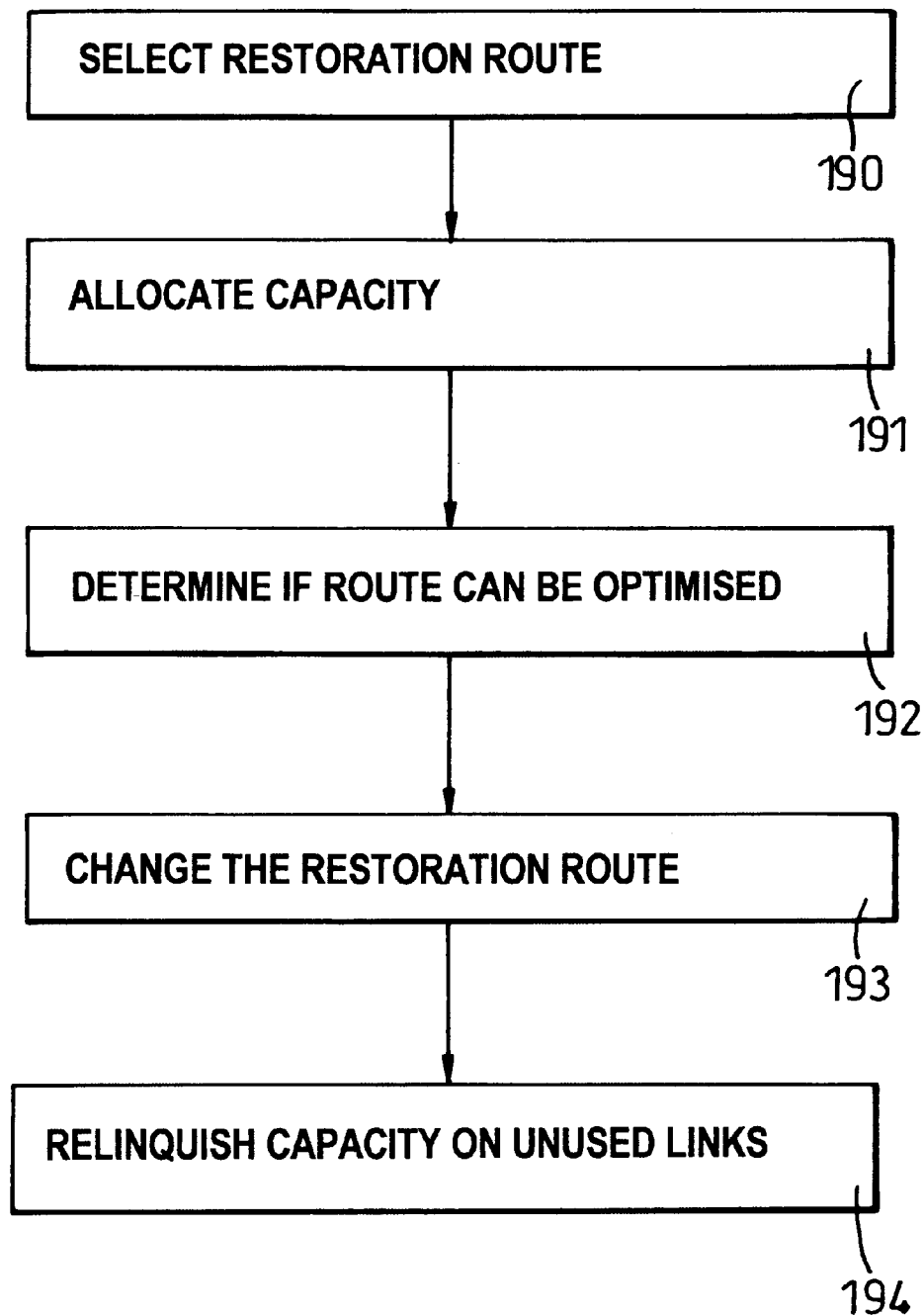
FIG. 16 shows in schematic form a restoration method with optimisation according to the present invention.

FIG. 16 shows how restoration capability can be improved by optimisation. After selecting a restoration route at step 190, capacity is allocated at step 191 to restore an existing virtual path as soon as possible. Then at step 192 it is determined if the route can be optimised. If so, the route is then changed, and unused capacity is relinquished at step 194.

As discussed above, some optimisation may be carried out before capacity is allocated, by appropriate choice of assignment algorithm. The techniques for optimisation described below can be applied either to optimise before allocation, or after allocation.

Figure 17:
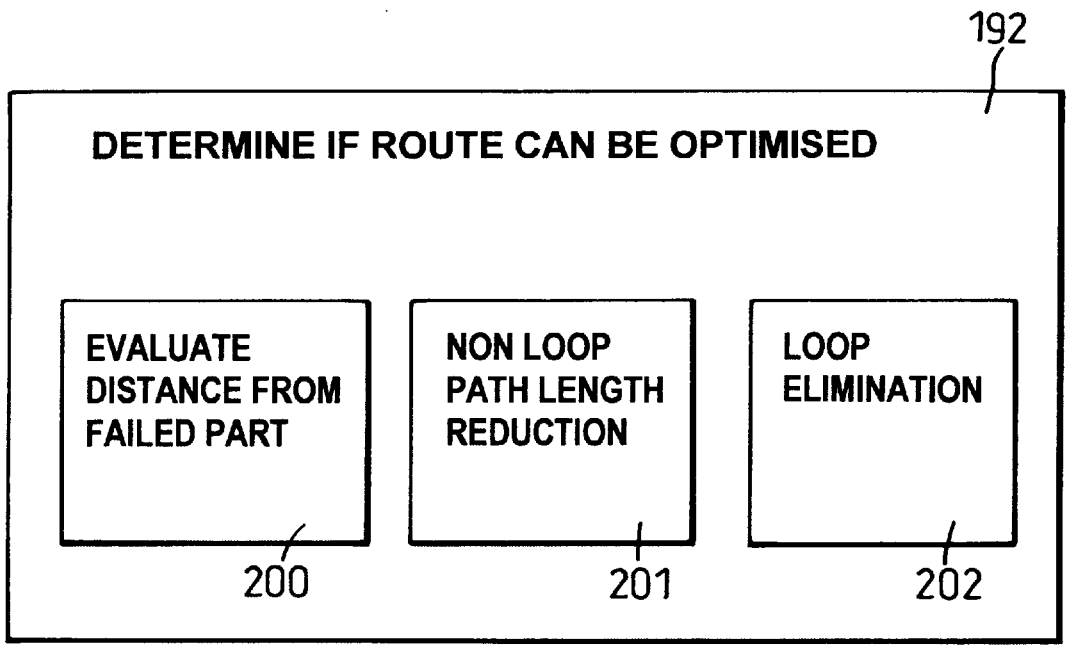
FIG. 17 shows in more detail the step of determining if the route can be optimised, shown in FIG. 16.

FIG. 17 shows three options for optimising a route. The distance from the failed part may be evaluated and relative scores for each route determined (step 200), as will be described with reference to FIG. 18. Non-loop path length reduction, step 201 may be used, and will be described with reference to FIG. 23. Loop elimination, step 202 will be described with reference to FIGS. 19 to 22.

Distance From Failed Path Evaluation

The idea of this scoring system is to force the restoration paths away from the most congested links closest to the failure. Such a technique utilises paths that might be longer, although they could increase the restored capacity. The paths discovered using this technique are called 'silent paths' since they already exist but do not make themselves attractive to the restoration process.

Figure 18:
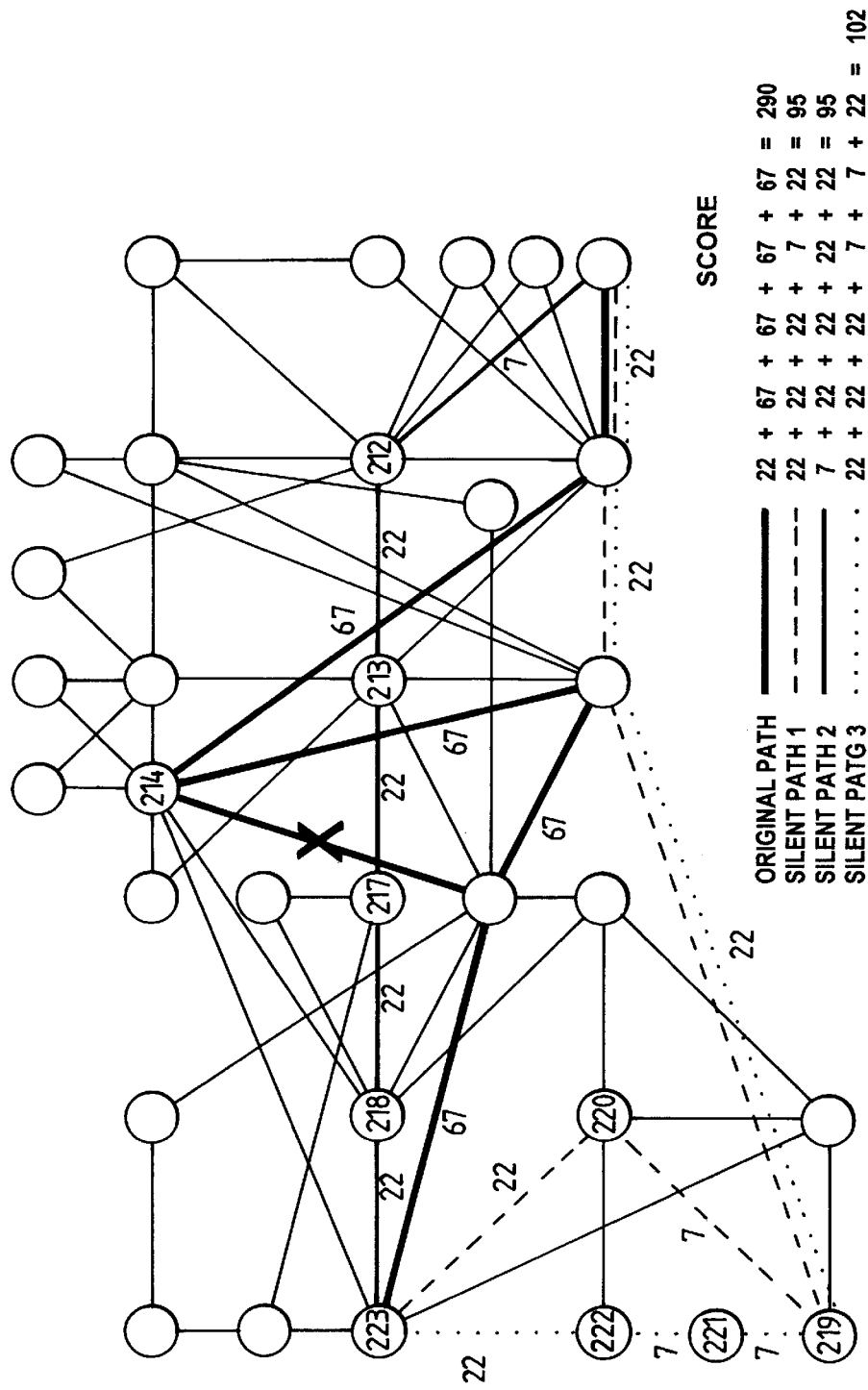
FIG. 18 shows a network demonstrating evaluation of distance from the failed part.

FIG. 18 shows the difference between a silent path and the current restored paths. To evaluate these silent paths they are given a score relative to their distance from the failed link. The optimum path can be selected on the basis of the score, along with other parameters.

Distance Score Determination

The first task is to inform nodes of their distance from the failed link and assign scores. This can be achieved by a two pass broadcast between the sender and the chooser. When a failure is detected the custodial nodes broadcast a single message to the other custodial nodes. As the message expands through the network a hop count is maintained. Depending on the lowest hop count received it provides the intermediate nodes with their distance from the failed link. Obviously the search is soon relinquished since a node can terminate a message if it has a hop count greater than the lowest count received.

Distance Score Value

The score assigned to each link is designed to allow a set number of links that are further from the failed link to be chosen instead of a closer link that is on a shorter path. For example, if the set number of links is given a maximum of 3, then a path can contain 3 links with a score one lower in preference to a link with a score one greater.

To determine the score of a link, there should be a predetermine distance, at which point the score is irrelevant, i.e. zero. This example will assume that links over 4 hops from the failure have a score of zero. Therefore the scores will be as follows if the set number of links is 3:

links that are 4 hops from the failed link score 2, links that are 3 hops from the failed link score (3*score of link 4 hops away)+1=7 links that are 2 hops from the failed link score (3*score of link 3 hops away)+1=22 and links that are 1 hop away, i.e. connected to the sender or chooser (3*score of link 2 hops away)+1=67

Optimising Paths Using Distance Scores

When this score is minimised a path will take a route further about the failure of the shortest route, although its length will be controlled. This can be achieved using either of the following two schemes or a combination of both with respect to the restoration algorithm presented herein.
Scheme 1:

The chooser can choose a restoration route that has the least score. This will normally ensure that the routes via the candidate choosers are filled first since they will incur a lower score.
Scheme 2:

An optimisation algorithm could be performed on paths either by the chooser or when the path has been established. Using the established path method means that any relinquished capacity cannot be immediately assigned to the chooser. Optimisations initiated by the chooser or candidate choosers will have the ability to inform the chooser.

The optimisation algorithm used to achieve scheme 2 must notify the chooser of any capacity it wishes to assign to the optimised path. The optimisation algorithm can determine the silent path by use of a search method between the restored path's end points. Once this point has been found a set of rules have to be followed to ensure compatibility with the restoration algorithm presented herein:

request the capacity from the chooser for the silent path, establish the silent path, relinquish the redundant capacity on the restoration path, return an acknowledgement to the chooser to disclose success/failure and any relinquished capacity.

With reference to FIG. 18 the initial restoration route is chosen since the algorithm implements a shortest path first assignment scheme. It can be seen that the capacity on the links could be assigned to other paths or it could be moved to links further from the failed link, and especially from the sender and primary chooser. The scoring system shows how silent paths further from the failed link can be found by minimising the score given to each link.

The silent path establishment is dependent on the controlling scheme used for the overall assignment algorithm. The techniques described for Scheme 2 are suitable for the restoration algorithm presented herein. Alternation may need to be made to ensure compatibility with other restoration methods.

Loop Elimination

Figure 19A:
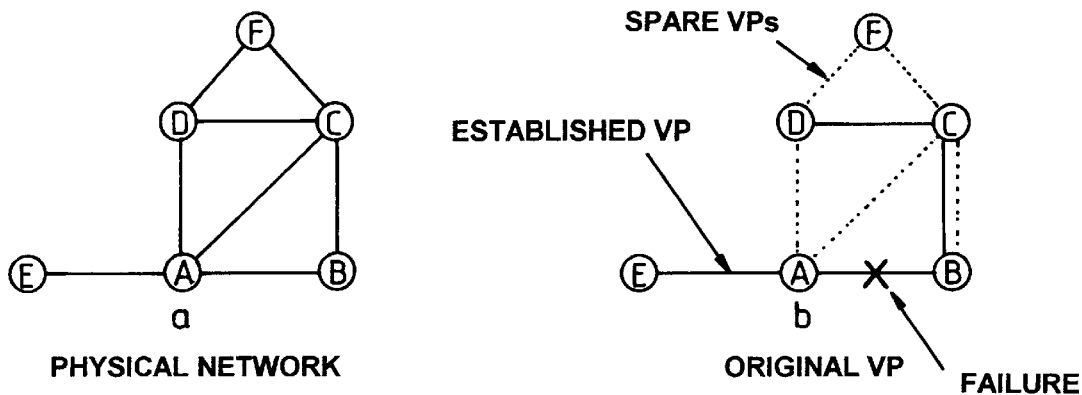
FIGS. 19A to 19C show nodes in a network, and show the loop elimination process.
Figure 19B:
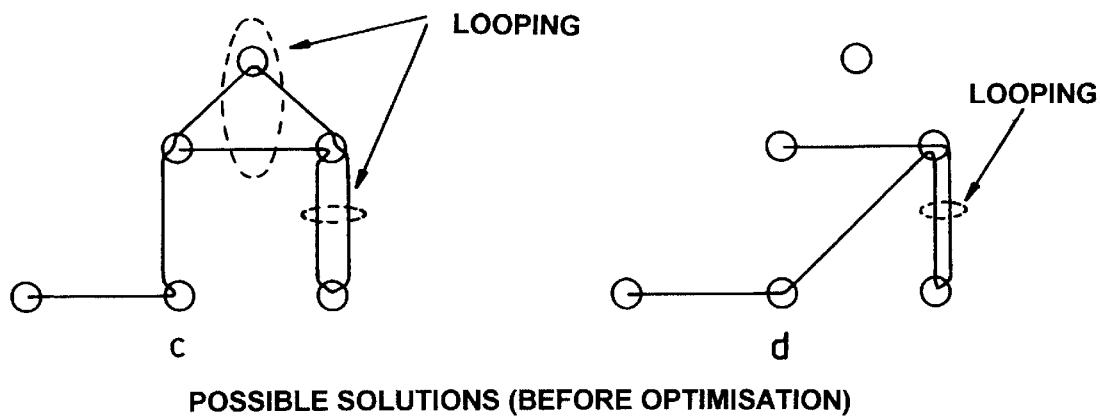
Figure 19C:
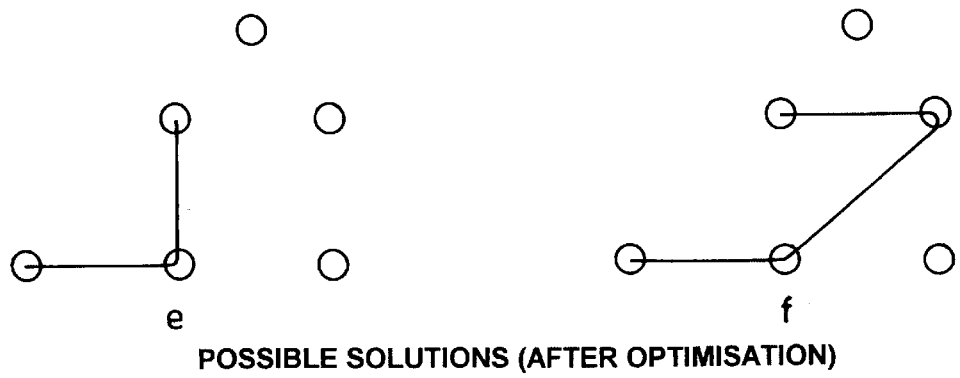

The original path and the path from the sender to chooser (primary or candidate) will, independently, contain no loops. It is the concatenation of the two that may cause loops to occur. FIGS. 19A, 19B and 19C show an example of how simple looping can occur. Particularly when operating at high network loads and when carrying delay-sensitive traffic it is advisable to relinquish all capacity contained in a loop and allow it to be reassigned to assist in restoring damaged paths.

The implementation of the loop elimination algorithm for this restoration algorithm has to consider the primary chooser as the database maintainer. The loop elimination algorithm must therefore converge to a solution and inform the candidate/primary choosers. Implementing the loop elimination in a distributed fashion will reduce the processing power needed at the chooser and helps in the design of a fail-safe solution. The algorithm is described in terms of VPs, although VC loop elimination is also achievable.

Figure 20:
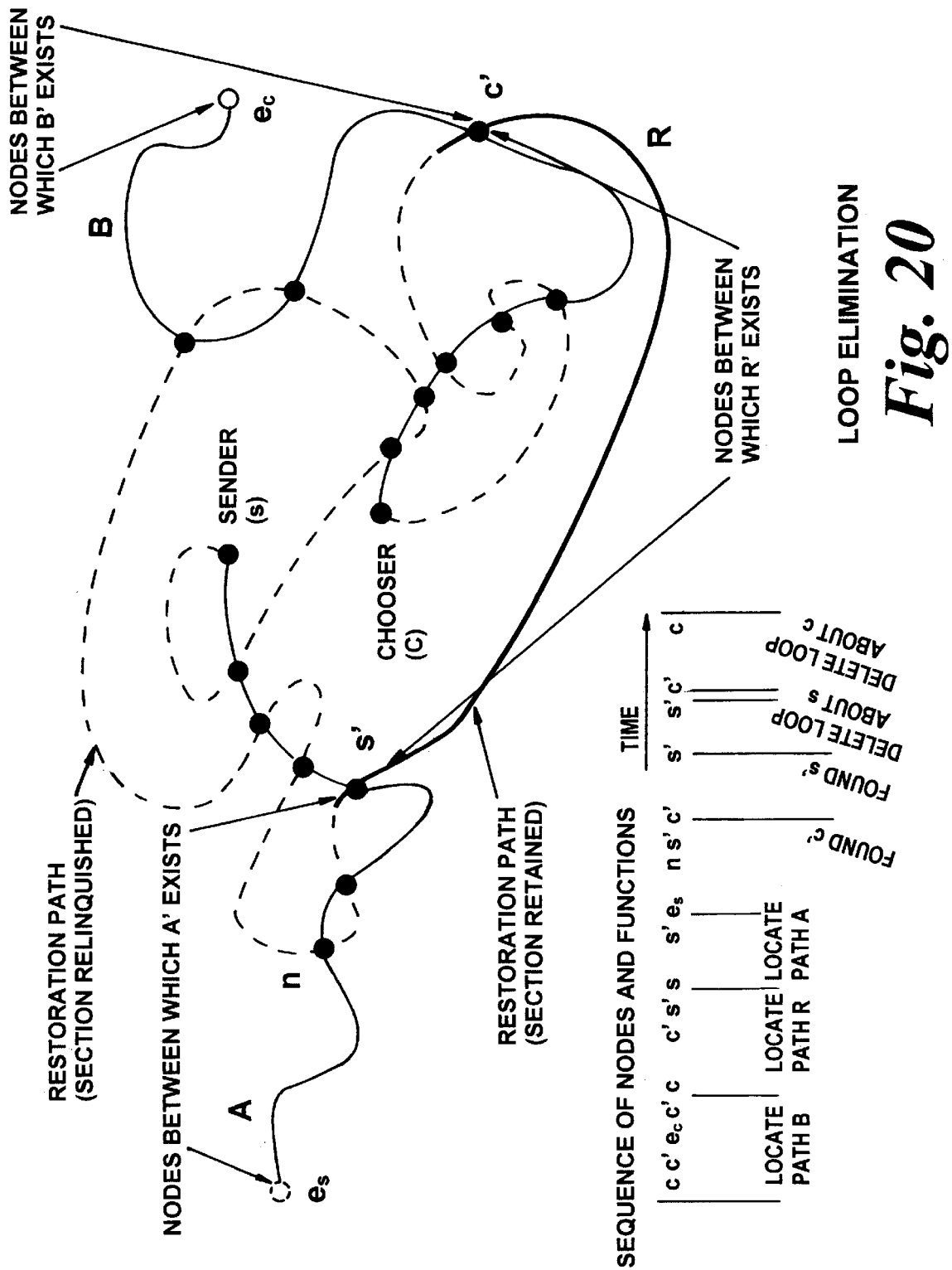
FIG. 20 shows a network of nodes and illustrates paths followed by a loop elimination message.

With reference to FIG. 20, there is shown a restored path such that A, B and R are the walks of all nodes on the paths $e_s$ to s, $e_c$ to c and s to c respectively: where s and c are the sender and chooser nodes and es and $e_c$ are the endpoints of the original path on the sender and chooser sides respectively. Since the original path contains no loops then A and B have no node in common. Within the restored path, formed by the walk of nodes A⊕R⊕B, there may be loops (where ⊕ indicates juxtaposition). An elementary result from graph theory indicates that the walk A⊕R⊕B contains a loop-free path. Assume that this path is A'⊕R'⊕B' where A' is a sub-walk of A, with terminators $e_s$ and s', R' is a sub-walk of R, with terminators $e_c$ and c' and B' is a sub-walk of B, with terminators s' and c'. It is the function of the algorithm to find s' and c' such that the solution can be realised.

The algorithm must alter the path at the nodes s' and c' in a fail-safe manner i.e. the loop should be bypassed before being eliminated, and the chooser database should be updated only after spare capacity has actually been relinquished. It can be seen that, since only two possible independent intersections can exist, there can be a maximum of two link-disjoint loops within the restored path, one containing s' and the other containing c'.

The algorithm is initiated by the chooser when the restoration path is assigned. From the theory above it can be seen that the intersection between the restoration path and the original path sections must be determined. To achieve this, the paths between the sender/chooser and their corresponding end-points, es, ec respectively, are marked to indicate the sets A, B and R. The three path sections are marked using a path type field within each node's routing table. To execute this process a single message, M, is used with which there are several fields: index value, path type, loop relinquish notification (rel), s' detection (S'), c' detection (C') and a table of relinquished capacity.

A single indexed M is sent from the chooser along the VP to $e_c$, with path type=B and S', C' and rel cleared, where each node in the path records the index and path type values for that VP. The message is reflected from ec to the chooser indicating identification of set B nodes. The identification of the nodes belonging to A and R can then proceed. The chooser sends M to the sender via the restoration route with path type=R, each node records the index and path type until the sender is reached. The process is repeated between the sender and $e_s$ with path type=A. Now A, B and R have been identified, valid nodes for s' and c' need to be found and the VP cross connected. $e_s$ reflects M with the S' bit set and each node in A checks for an identical index recorded in R, i.e. an identically indexed path type R VP. If such a record exists then there is a crossing of paths and M is sent out on the restoration path in the direction of the chooser with the C' bit set. From this point the first occurrence of an identically indexed path type B VP indicates the intersection node in between R and B, i.e. c', consequently on receiving M the node checks for an identically indexed VP with path type B. If such a path is found then c' has been found and a connection can be made between the VPs with types of B and R. The node records the c' status and returns M, with S' set and C' cleared, towards the sender to locate s'. s' is the first node to locate an identically indexed path of type A (note this may be the same node as c'), therefore locating the intersection between A and R, i.e. s'. The R type and A type VPs connect at s' to complete the walk A' is A'⊕R'⊕B', i.e. a loop-less path.

Now that s' and c' have been identified and the path reduced, the loops can be relinquished. The chooser must be informed of the relinquished capacity therefore the loop about s' must be relinquished first. This is accomplished by simply passing M towards the sender on the restoration route with the rel bit set. Each node relinquishes the incoming VP and records the information in M's table. s' terminates the process, clearing the rel bit when M has completed the loop, and passes M towards c'. At c', M' is created, M and M' pass along the paths of type R and B respectively towards the chooser, with the rel bit set. The relinquished capacity is recorded and both messages terminate at the chooser. The chooser can include the data from M and M' into the database.

Since loops are not deleted until the path is modified into a loop free form, the algorithm fails safe in the event of either M or M' being lost. The chooser is only informed of the relinquished capacity when all the loops have been deleted, ensuring no dual capacity assignment. The method seeks loops containing the sender or the chooser, and thus will inevitably facilitate reuse of capacity in the most congested areas near the failed part.

Figure 21A:
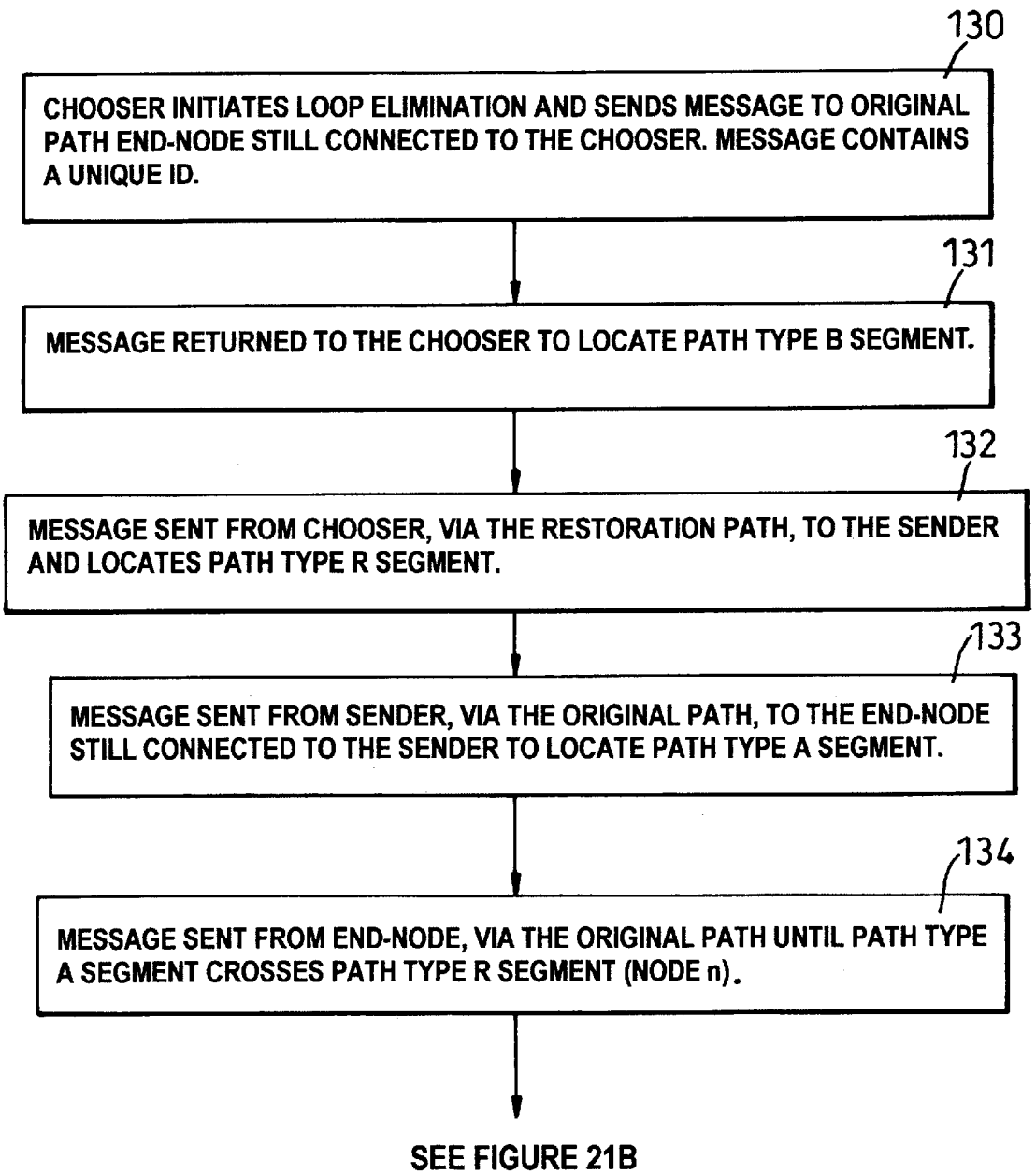
FIGS. 21A and 21B show the operation of a loop elimination message.
Figure 21B:
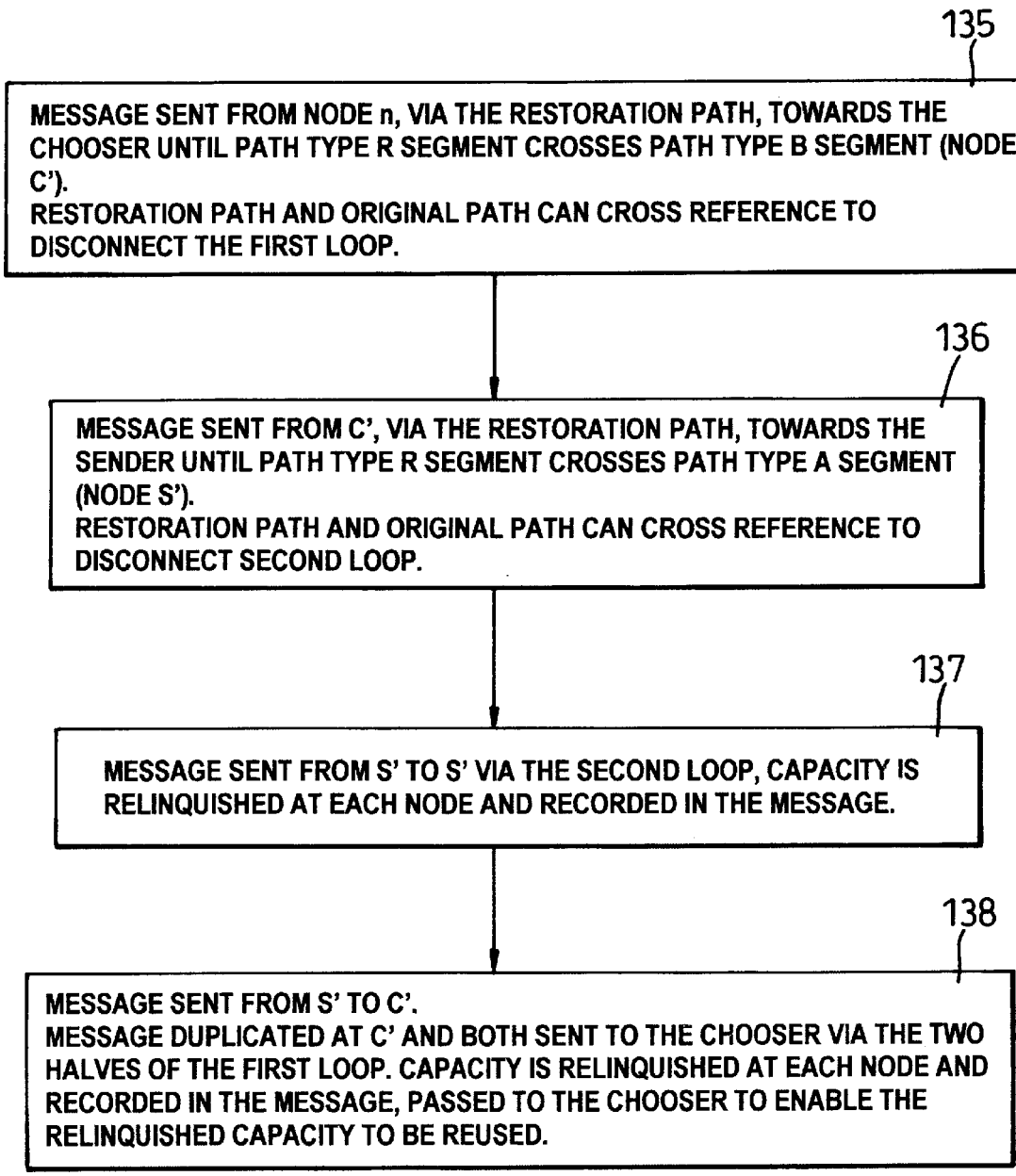

FIGS. 21A and 21B summarise the principal steps in the process. At step 130 the chooser initiates loop elimination and sends a message to the original path end node still connected to the chooser. The messages returned to the chooser to locate the path type B segment. Next the message is sent from the chooser via the restoration path to the sender to locate the path type R segment. The third segment type A is identified by the message being sent from the sender via the original path to the end node still connected to the sender.

At step 134 the message is sent on from the end node via the original path until the path type A segment crosses the path type R segment. Then the first loop around the sender can be disconnected at step 135. At step 136 a second loop can be disconnected. At step 137 capacity is relinquished in the second loop by sending the message around the loop and recording the capacity relinquished. Finally, to enable the relinquished capacity to be reused, at step 138, a message is sent to the chooser. As there are two paths to the chooser, since it is in a loop, the message is duplicated, and the capacity relinquished in each half of the loop is recorded by the message and passed to the chooser.

Figure 22:
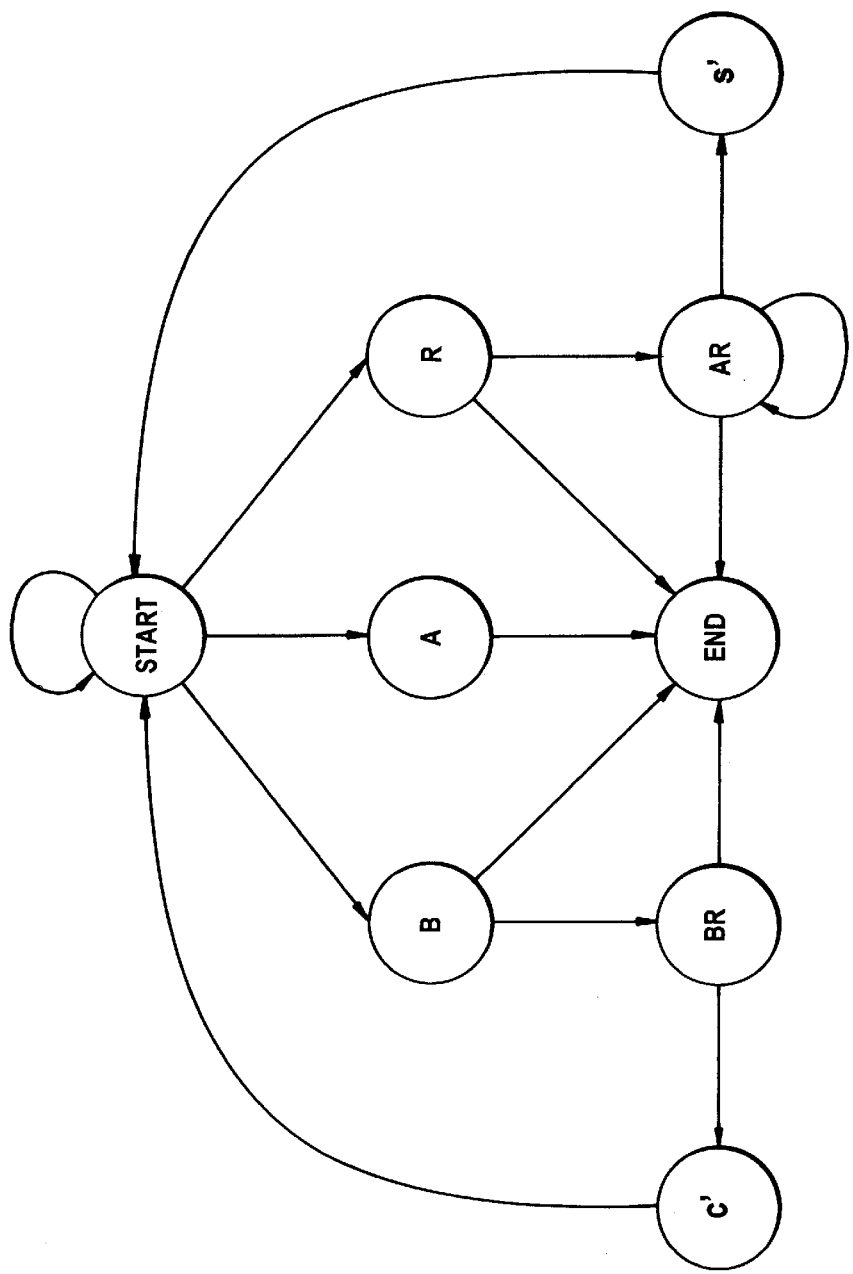
FIG. 22 shows a state diagram for a message performing loop elimination.

FIG. 22 shows a state diagram for the message performing the loop elimination. In the state transition table below, for nodes passing the loop elimination message, the current and next state are indicated and for each transition, the message field received by the current node is shown, and the action to be taken by the current node is shown.

TABLE 2

STATE TRANSITION TABLE FOR NODES PASSING LOOP ELIMINATION MESSAGE

| Current State | Received Message Field | Action Current Node | Next State |
|---|---|---|---|
| Start | rel = 1 or<br>s' = 1 or<br>c' = 1 | Delete M | Start |
| Start | path type = B<br>s' = 0<br>c' = 0<br>rel = 0 | | B |
| Start | path type = A<br>s' = 0<br>c' = 0<br>rel = 0 | | A |
| Start | path type = R<br>s' = 0<br>c' = 0<br>rel = 0 | | R |
| B | path type = R<br>s' = 0<br>c' = 0<br>rel = 0 | | BR |
| B | rel = 1 | Relinquish Incoming VP | End |
| A | rel = 1 | Relinquish Incoming VP | End |
| R | rel = 1 | Relinquish Incoming VP | End |
| R | path type = A<br>s' = 0<br>c' = 0<br>rel = 0 | | AR |
| C' | c' = 1<br>rel = 0 | Create M'<br>Set rel = 1 in M & M'<br>Send M via R<br>Send M' via B | Start |

TABLE 2-continued

STATE TRANSITION TABLE FOR NODES PASSING LOOP ELIMINATION MESSAGE

| Current State | Received Message Field | Action Current Node | Next State |
|---|---|---|---|
| BR | c' = 1 rel = 0 | Set c' = 1, s' = 1 | c' |
| BR | rel = 1 | Relinquish Incoming VP | End |
| AR | rel = 1 | Relinquish Incoming VP | End |
| AR | Incoming on R s' = 1 rel = 0 | Set rel = 1, s' = 0 | s' |
| AR | Incoming on A s' = 1 rel = 0 | Set c' = 1, s' = 0 | AR |

Note:
All states will return to START if no action occurs for a specified time.
All states pass M in the current direction unless otherwise indicated

Non-Loop Path Length Reduction

This is another distributed optimisation process. It may be used in conjunction with the other processes.

Figure 23:
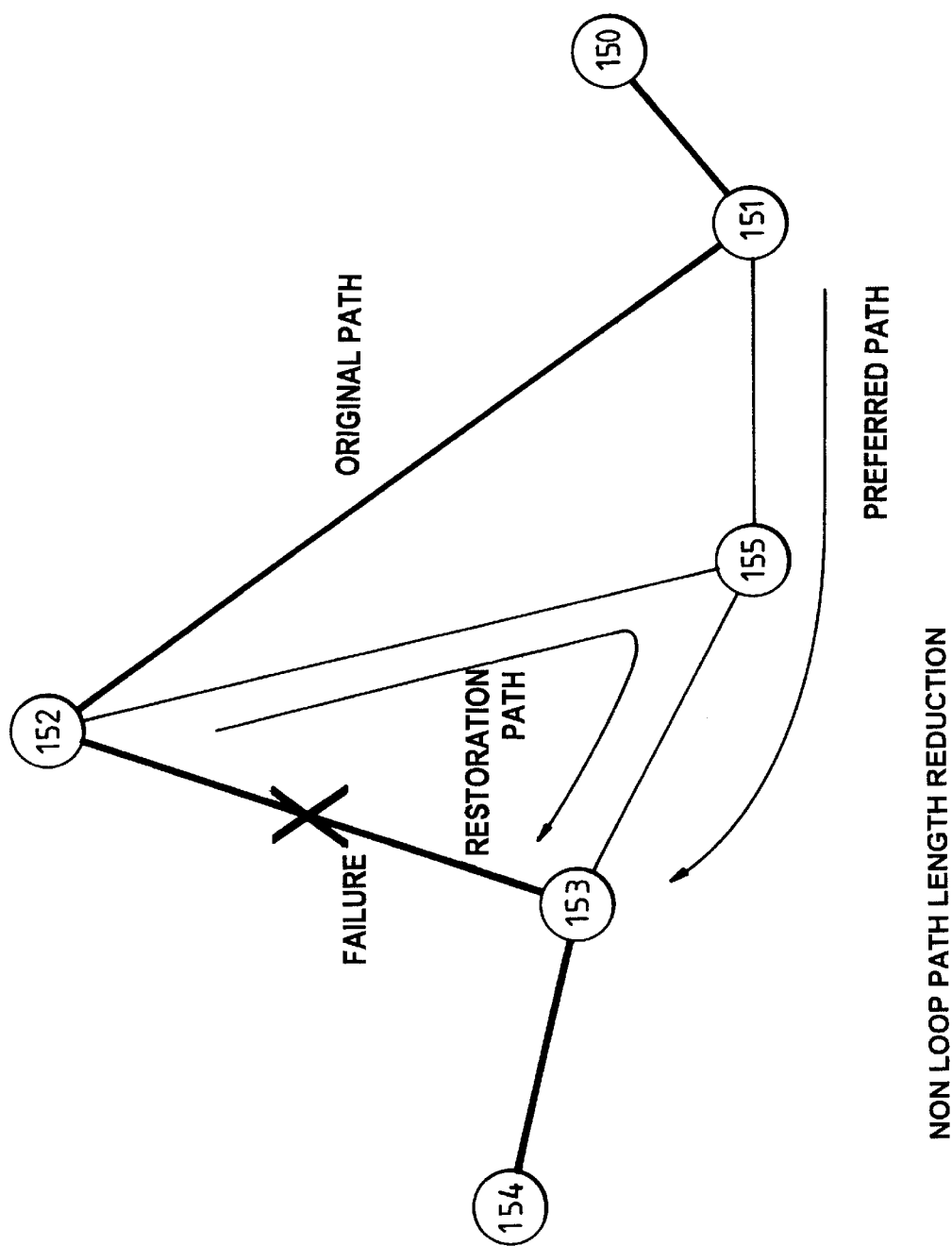
FIG. 23 shows in schematic form non-loop path length reduction.

It can be seen from FIG. 23 how a restored link, containing no loops, can occupy unnecessary capacity on a critical link; provided capacity is available to move the path. Currently, the only methods to determine these paths require global restoration algorithms that are time consuming and require significantly more data processing. A locally controlled optimisation method will now be described, developed for high speed restoration techniques, to improve their restoration ability.

The optimisation process simply determines any reduction in the path using a single link. The following description of the basic process is a simplified example.

The algorithm is simple because it attempts to find a single link to replace multiple links occupied by the restored path. Therefore, the end-points of the single link must exist on the restored path. The optimisation process then becomes a simple test for nodes already on the path that are separated by a single link, where that single link is not on the path. This can be achieved by passing a single message from one end-point to the other. As the message passes each node on the path it marks the link with a unique ID. Then each node tests to see if any of its neighbouring nodes (excluding the nodes known to be on the path) contain the same ID. If a node is found then it must exist on the same path and must be closer to the end-point with respect to the node(s) previous neighbour. The path can then be reduced, provided enough spare capacity is available over the requested link.

Concluding Remarks and Implementation Considerations

The present invention is particularly suitable for restoration of highly loaded networks using node complex spare capacity assignment. Previous algorithms required an average network utilisation of approximately 60%, giving approximately 40% spare capacity. Even then either pre-planned capacity allocation would be needed to ensure sufficient spare capacity, or 100% restoration would not be achieved. However, many networks currently used have loadings of approximately 90%, to minimise costs. The invention is particularly applicable to improve restoration performance where approximately 10% spare capacity exists. The restoration uses distributed techniques, dynamically adaptive to changing network configurations. It can be used to assist in network planning.

If used in an ATM network using virtual paths, spare capacity can be increased by reducing the VPs down to their lowest guaranteed capacity level. Spare capacity can also be increased by reducing the load by prioritisation or a selective removal of traffic.

The capacity of the VPs is defined during connection set up. VPs may be divided into smaller VPs if a path through the network cannot be found for the VP as a whole. This processing can only take place at virtual connection (VC) switches, otherwise VPs must be restored as a whole. This is one advantage of ATM networks which can be exploited to achieve optimal results.

When implementing the restoration algorithm, every node within the network must be able to execute the functions of sender, primary chooser, candidate chooser or tandem node. The loop elimination algorithm must be processed in parallel with these functions. The function of primary chooser is the most processor and memory intensive since for the duration of the restoration it must consolidate and maintain a database of all paths from the sender to itself and every candidate chooser.

The average memory utilisation is dependent on the average degree of the network and can be calculated by using $$ND^{HC} \times (ND+1) \qquad (2)$$

where,

ND=average network degree,

HC=limiting flood search hop count.

Note that (ND+1) in (2) is for candidate choosers and should be removed for single chooser case. Using candidate choosers increases the number of entries but, when candidates are not used, the significantly increased limiting hop count also requires more entries.

Typically, only 6 hops are required for the candidate choosers method with loop elimination. So, in a network with an average degree of 4, 20, 280 entries are needed. For the original FCFS algorithm without candidate choosers up to 13 hops are required, needing 67 million entries.

Processing power is more difficult to estimate since it is very dependent on the design of the software. To gauge the processing ability, simulations were executed on a Sun SPARC Station 10 with 32 Mbytes of memory. For the loop elimination algorithm with added delay and candidate choosers the process took less than 1 second. This also includes the flooding process in determining the restoration paths and distributed processing for the loop elimination algorithm. The processing power not only depends on memory utilisation, but also on the network's spare capacity and its distribution. There should be sufficient processing power to implement such algorithms in a modern switch.

The algorithms could allow for various levels of quality of service within the network. This means not only the creation of an ordered QoS for VPs, but assigning qualities to different links within the network. The VP routing would then be based on the VP length, link QoS and service QoS parameters. A technique called bumping could be introduced which removes paths with a lower priority and replaces them with paths of a higher priority.

A further variation concerns extending the candidate node concept. The candidate chooser set includes all nodes that are adjacent to the chooser. The idea of the candidate chooser set is to allow improved restoration for node failures, i.e. when the chooser node has failed. If the candidate chooser set of nodes is used for link failures then the cutset capacity about the candidate chooser could be increased, and therefore the efficiency of the algorithm could be increased. Extending the idea to all nodes that are adjacent to the sender will also result in a probable increase in the minimum cutset capacity, and therefore a more efficient restoration process.

As set out above, it is proposed that the sender creates a single flooding instance between each candidate chooser and the 'primary' chooser. To implement this, the sender requires the node identification of all candidate nodes for each VP, which is not unreasonable since it is required for node restoration. For all search instances the tandem nodes inform the chooser (candidate or primary) of the same spare capacity. When a candidate chooser receives messages for itself, it informs the primary chooser of the received information. From the database the primary chooser identifies failed VPs passing through that candidate chooser and the amount of spare capacity available for its restoration. The primary chooser informs the candidate chooser of any restoration process. Upon completion it is the function of the candidate chooser to initiate any loop elimination processes and inform the primary chooser of any relinquished capacity. This message passing structure becomes even more complex when the candidate concept is introduced so care may need to be taken in providing an appropriate mechanism.

The greatest improvement in restoration performance over the original algorithm may be achieved when the candidate chooser method is implemented. It is likely, therefore, that extension to include a candidate sender concept could increase the efficiency performance of the restoration process, including a full implementation of candidate sender to candidate chooser assignment where applicable. To achieve full candidate node restoration probably only a single flooding instance is required between the sender and chooser. More processing is introduced in the chooser node. The chooser is required to know the route of each VP from the candidate chooser to the candidate sender, i.e. 3 hops. When the chooser receives a restoration path, through the sender/chooser broadcast search process, the path can be tested for candidate node restoration. For every restoration path, each neighbour of the sender is called a candidate sender; correspondingly each neighbour of the chooser is called a candidate chooser. Note that in some cases a candidate sender node may also be a candidate chooser node. As details of each restoration path arrive at the primary chooser, the chooser can determine whether any increase in capacity can be obtained by ignoring the link to the candidate sender and candidate chooser, i.e. the first and last links in the path. If this is possible then the restoration capacity for this restoration path is increased for all failed VPs that include both candidate nodes. These VPs are known as known as candidate sender/chooser VPs (CSCVPs). When no more CSCVPs can be restored, the restoration path is considered to include the candidate sender link and the candidate chooser link. In each consideration the algorithm attempts to restore candidate sender VPs (CSVPs) and candidate chooser VPs (CCVPs) respectively. CSVPs are defined as extending between candidate sender and the actual chooser, while CCVPs are defined as extending between candidate choosers and actual sender.

At each modification of the restoration path, the path's capacity is set to the minimum of the modified restoration path, i.e. the minimum of either the candidate node link or the capacity remaining over the unmodified portion of the path. When no more CSCVPs, CSVPs and CCVPs exist, the restoration path's capacity is set to the minimum of the restoration path with both candidate node links reestablished. All other failed VPs are then processed over the entire restoration path. Using this technique it is possible to increase the cutset capacity about the sender as well as the chooser more frequently. Note, again, that all VPs are assigned to restoration paths using a first-fit algorithm that, intuitively, might seem to reduce the algorithm's efficiency. However, it is appealing when computation time needs to be minimised. The alternatives of worst case or best case fit require more processing and are not guaranteed to give any improvement.

Other variations will be apparent to a skilled man within the scope of the claims.

What is claimed is:

1. A method of determining an alternative route for a communication between nodes in a network, following failure of part of the network, the network comprising a plurality of nodes, and links between the nodes, the method comprising the steps of:

determining a plurality of possible alternative routes around the failed part and having any spare capacity;

passing messages between nodes along the possible alternative routes to gather information relating to an amount of spare capacity of each link in the possible alternative routes; and selecting the alternative route for the communication from said possible alternative routes on the basis of at least the gathered link spare capacities.

2. The method of claim 1 further comprising the steps of:

selecting at least one of the nodes as a chooser node; and passing information relating to the determined spare capacities to a chooser node, wherein the step of selecting the alternative route is carried out by the chooser node.

3. The method of claim 2 comprising the steps of:

using the chooser to select a further alternative route for a further communication on the basis of the link spare capacities determined at the outset, and the capacity occupied by the first alternative route.

4. The method of claim 1 further comprising the step of allocating at least a part of the spare capacity of each link used by the selected route, to the selected route.

5. The method of claim 1 further comprising the step of determining whether the alternative routes use nodes in the vicinity of the failed part, wherein the selecting step is carried out also on the basis of the determined number of nodes used in the vicinity of the failed part.

6. The method of claim 1 wherein the route comprises a virtual path.

7. The method of claim 1 further comprising the steps of:

selecting a sender node on one side of the failure, from which the messages are sent; and selecting a chooser node on the other side of the failure to receive the messages, wherein information relating to the determined spare capacities is stored at the chooser node, and the selecting step is carried out by the chooser node.

8. The method of claim 7 wherein the chooser node is one of the nodes on an original route for the communication before the failure.

9. The method of claim 8 wherein at least one candidate chooser node is identified, further from the failed part than the chooser, on the original route, and the messages are also sent to the candidate chooser, to determine possible alternative routes not passing through the chooser.

10. The method of claim 8 wherein at least one candidate sender node is identified, further from the failed part than the sender, on an original route for the communication, and the messages are also sent from the candidate sender, to determine possible alternative routes not passing through the sender.

11. The method of claim 1 further comprising the step of changing the selected alternative route to optimise it.

12. The method of claim 11, wherein the step of optimising comprises the step of reducing the length of the selected alternative route.

13. The method of claim 11 wherein the step of optimising comprises the step of avoiding using nodes in the vicinity of the failed part.

14. The method of claim 1 for providing alternative routes for multiple concurrent communications, the method comprising the steps of:
 allocating a portion of the spare capacity on one of the alternative routes to a first of the communications;
 allocating remaining spare capacity, to others of the concurrent communications according to the spare capacity determined at the outset, and the amount of spare capacity already allocated.

15. The method of claim 1 further comprising the step of using the selected alternative route for the communication.

16. A method of providing alternative routes for multiple concurrent communications between nodes in a network, following failure of a part of the network affecting the multiple communications, the network comprising a plurality of nodes, and links between the nodes, the method comprising the steps of:
 determining the route has failed;
 determining alternative routes around the failed part;
 selecting at least one of the nodes in the vicinity of the failed part, as a chooser node;
 determining an amount of spare capacity on the alternative routes, and using the chooser node to control allocation of the determined spare capacity on the alternative routes to the multiple concurrent communications.

17. A network comprising:
 a plurality of nodes and links connecting the nodes, for passing information along a route set up across the network via the nodes, the network further comprising:
 means for determining a plurality of possible alternative routes having any spare capacity in the event of failure of part of the network;
 means for passing messages along the possible alternative routes to determine an amount of spare capacity of each link in the alternative routes; and
 means for selecting one of the possible alternative routes on the basis of the determined link spare capacities.

18. A node for a network, the network comprising a plurality of such nodes, interconnected by links, for passing information along a route set up across the network, the node comprising:
 means for determining a plurality of possible alternative routes having any spare capacity for use in the event of failure of part of the network and;
 means for passing messages along the possible alternative routes to gather information relating to the spare capacity of each link in the possible alternative routes; and
 means for receiving information relating to the spare capacity of each link in the possible alternative routes, and selecting at least one of the alternative routes on the basis of the received information.

19. Apparatus for determining an alternative route for a communication between nodes in a network, following failure of part of the network, the network comprising a plurality of nodes, and links between the nodes, the network being arranged to determine plurality of possible alternative routes having sufficient spare capacity around the failed part for the communication the apparatus comprising;
 circuitry for receiving messages from nodes along the possible alternative routes, the messages comprising an indication of an amount of spare capacity of the links in the possible alternative routes; and
 circuitry for selecting the alternative route for the communication from the possible alternative routes on the basis of at least the amounts of spare capacity of the links.

20. The apparatus of claim 19 further comprising circuitry for determining a remaining spare capacity for the links of the alternative route after some of the spare capacity for each of these links has been allocated to the communication.

21. The apparatus of claim 20 for determining alternative routes for at least one further communication, comprising;
 circuitry for selecting an alternative route for the further communication, from the possible alternative routes on the basis of at least the remaining spare capacity.

22. Software for carrying out the method of claim 1.

23. Software for a node of a network, the network comprising a plurality of such nodes, interconnected by links, for passing information along a route set up across the network. The network being arranged to determine a plurality of possible alternative routes for use in the event of failure of part of the network, the software being arranged to carry out the steps of;
 receiving messages from nodes along the possible alternative routes, the messages comprising an indication of an amount of spare capacity of the links in the possible alternative routes; and
 selecting the alternative route for the communication, from the possible alternative routes, on the basis of at least the link spare capacities.

24. A method of using the network of claim 17 to provide a communication service by passing information.

* * * * *